(12) United States Patent
Miller et al.

(10) Patent No.: US 11,180,387 B2
(45) Date of Patent: Nov. 23, 2021

(54) VOLTAGE-CONTROLLED, HYDRODYNAMICALLY ISOLATED, ION-GENERATION APPARATUS AND METHOD

(71) Applicant: THOUGHT PRESERVE, LLC, Fallbrook, CA (US)

(72) Inventors: C. Michael Miller, Anaconda, MT (US); David Bell, Farmington, UT (US); Mark Hubbard, West Jordan, UT (US)

(73) Assignee: Thought Preserve, LLC

( * ) Notice: Subject to any disclaimer, the term of this patent is extended or adjusted under 35 U.S.C. 154(b) by 0 days.

(21) Appl. No.: 16/653,570

(22) Filed: Oct. 15, 2019

(65) Prior Publication Data

US 2020/0180981 A1 Jun. 11, 2020

Related U.S. Application Data

(60) Continuation-in-part of application No. 15/902,313, filed on Feb. 22, 2018, now Pat. No. 10,995,020.
(Continued)

(51) Int. Cl.
*C02F 1/46* (2006.01)
*C02F 1/463* (2006.01)
*C02F 101/20* (2006.01)

(52) U.S. Cl.
CPC .......... *C02F 1/463* (2013.01); *C02F 2101/20* (2013.01); *C02F 2301/024* (2013.01)

(58) Field of Classification Search
CPC .... H01M 8/004; H01M 8/16; H01M 8/04186; H01M 8/225; Y02E 60/527;
(Continued)

(56) References Cited

U.S. PATENT DOCUMENTS 6,348,154 B1 2/2002 Stewart
7,060,017 B2 6/2006 Collier
(Continued)

FOREIGN PATENT DOCUMENTS

WO WO-2005069892 A2 * 8/2005 ........... C25B 11/036
WO WO-2014172582 A1 * 10/2014 ............ C12N 13/00

OTHER PUBLICATIONS

Exterran, Deep Bad Nutshell Filter Evolution, p. 1-15, 2013.
(Continued)

*Primary Examiner* — Walter D. Griffin
*Assistant Examiner* — Cameron J Allen
(74) *Attorney, Agent, or Firm* — Pate Baird, PLLC

(57) ABSTRACT

An apparatus and method isolating ion generation from target metal precipitation and flocculation rely on an ion generator and a precipitation reactor distinct, separated, optimized, and otherwise independent, so no co-habitation of ion generation and precipitation, nor their flow regimes, is permitted. Plug flow is hyper turbulent in the ion generator. Flow is quiescent to laminar the precipitator. Coating sacrificial anodes is avoided by not over driving currents for ionization at the anode. Control of electrical resistance across flows of very high TDS (over 200 kppm, often over 225 kppm) is accomplished by selectively masking a portion of the anode, cathode, or both of such electrodes. Masks may be dielectric films or layers, such as plastic sheets or tubes, or curtains of bubbles injected into the flow near an electrode.

13 Claims, 17 Drawing Sheets

Related U.S. Application Data which is a division of application No. 14/313,392, filed on Jun. 4, 2014, now Pat. No. 10,011,505.

(60) Provisional application No. 62/746,409, filed on Oct. 16, 2018, provisional application No. 61/838,464, filed on Jun. 24, 2013.

(58) Field of Classification Search
CPC ............ B01D 21/0003; B01D 21/0009; B01D 21/0045; B01D 21/0057; B01D 21/2411; B01D 21/245; B01D 21/34; C02F 1/50; C02F 1/74; C02F 1/76; C02F 1/24; C02F 1/463; C02F 1/4674; C02F 2103/002; C02F 2103/005; C02F 2103/008; C02F 2303/04; C02F 2305/023; C02F 2101/20; C02F 2301/024; C02F 1/52
See application file for complete search history.

(56) References Cited

U.S. PATENT DOCUMENTS

| | | | |
|---|---|---|---|
| 7,309,408 B2* | 12/2007 | Benavides | B01D 25/164 204/520 |
| 8,187,474 B2 | 5/2012 | Freeman | |
| 2002/0170816 A1 | 11/2002 | Leffler et al. | |
| 2003/0000842 A1 | 1/2003 | Matejat et al. | |
| 2003/0173300 A1* | 9/2003 | Bradley | B01D 17/06 210/665 |
| 2009/0204419 A1 | 8/2009 | Stewart | |
| 2010/0203361 A1 | 8/2010 | Premier et al. | |
| 2012/0205301 A1 | 8/2012 | McGuire et al. | |

OTHER PUBLICATIONS

McGraw Hill Higher Education, Unit Operations of Chemical Engineering, Seventh Edition, p. Chapter 2, p. 39-41, 2005.

Eastern Economy Edition, Transport Processes and Separation Process Principles, Christie John Geankoplis, Fourth Edition, p. 932-939, 2003.

John Wiley & Sons, Department of Chemical Engineering, R. Byron Bird, Warren E. Stewart, Edwin N. Lightfoot, Transport Phenomena, p. 85, 1960.

Wiley-India, Dale E. Seborg, Process Dynamics and Control, Second Edition, Thomas F. Edgar, Duncan A. Mellichamp, p. 159-160 and p. 433-435, 2004.

McGraw Hill, Perry's Chemical Engineers' Handbook, Eighth Edition, Don W. Green, p. 18-114-116, 15-91-93, and 15-96-102, 2008.

High-Tech Consultants, Inc., Oilfield Water-Oil-Solids Separation, Bill Ball, Sep. 19, p. 1-17, 2005.

IOP Publishing, Nanostructured materials for water desalination, T. Humplik, J. Lee, S.C. O'her, B.A. Fellman, M.A. Baig, S.F. Hassan, M.A. Atich, F. Rahman, T. Laoui, R. Karnik, E.N. Wang, p. 1-19, 2011.

* cited by examiner

VOLTAGE-CONTROLLED, HYDRODYNAMICALLY ISOLATED, ION-GENERATION APPARATUS AND METHOD

1. RELATED APPLICATIONS

This application: claims the benefit of U.S. Provisional Patent Application Ser. No. 62/746,409, filed Oct. 16, 2018; and is a continuation in part of U.S. patent application Ser. No. 15/902,313, filed Feb. 22, 2018; which is a divisional of U.S. patent application Ser. No. 14/313,392, filed Jun. 24, 2014; which claims the benefit of U.S. Provisional Patent Application Ser. No. 61/838,464, filed Jun. 24, 2013; all of which are hereby incorporated herein by reference.

BACKGROUND

1. Field of the Invention

This invention relates to treatment of waste water and, more particularly, to novel systems and methods for heavy metals removal from a waste water stream.

2. Background Art

Prior art systems exist for various types of waste water treatment. For example, recycling waste water from sewage systems in cities is classic and well established. Moreover, production water from petroleum production and coal-bed methane production is also well established.

Typically, removal of heavy metals in particular is accomplished in a vat or tank dedicated to an electrochemical, water treatment process. In this process, conventional systems focus on a balance between problems. For example, fouling occurs as a result of flocculation and precipitant accumulation on electrodes and other reactive surfaces. Engineers balance between throughput or flow rate of waste water treated and efficiency measured with respect to the amount of surface area available on reaction plates, and so forth.

Typically, maintenance is excessive in many designs. In fact, much of the prior art is dedicated to the issue of maintenance of systems particularly with regard to cleaning off reaction plates (electrodes). Various deposits may accumulate as a direct result of chemical reactions in the waste water treated and the electrical activity near the electrode.

As a practical matter, maintenance, and particularly cleaning of electrode plates, is at the center of much of the prior art literature and accepted as a given, or requirement. It is simply inescapable, due to the nature of the processes occurring in the reactor tank. For example, an electrochemical reaction occurs at each of two electrodes. Typically, a sacrificial anode or simply an anode will donate positive current (draw electrons) in order to generate certain ions.

At an opposite, cathodic, electrode, electrons are donated to ions, such as ions of hydrogen. This generates hydrogen gas as a byproduct of the freeing up of ions for reaction in the tank. The release of hydrogen and formation of hydrogen ions into hydrogen gas are a direct result of balancing the electrochemical reaction. Stated another way, the balanced half reaction of the hydrogen necessarily involves acceptance of electrons and formation of the hydrogen gas.

Another aspect of the prior art is the attention to certain electrical schemes created for the purpose of interference with, reduction of, or reversal of the plating out or coating of undesirable materials over electrodes. Coating of electrodes tends to interfere with their effectiveness, system efficiency, and so forth. As a practical matter, reversing polarity between electrodes is a common approach to reversing the coating process.

Nevertheless, it has been found by the inventors that such coating processes are not necessarily reversible. In fact, they tend to resist reversal, and require effectively undercutting the coating in order to remove it. In other words, the coating often becomes an effective dielectric or insulation barring free flow of electrons in the reactions at the electrodes.

In other prior art systems, the generation of hydrogen bubbles, and their natural tendency to rise, are relied upon as an agitation source to scrub or remove coatings from surfaces. As a practical matter, due to boundary layer theory of fluids, these actually tend to simply disrupt the formation process, and are largely ineffective, for actually removing deposits that have already been deposited on an electrode.

In short, myriad schemes for manipulating polarities, cycle times, frequencies, and the like exist in the prior art. Regardless of attempts to optimize surface areas, optimize resistance to coating by insulating reaction products, minimize fouling by flocculating compositions, and the like have largely been effective only in slowing the process of coating, and not effectively eliminating extensive maintenance operations and costs. Thus, what is needed is a system that operates with a minimum of maintenance. In fact, it would be a great advance in the art to provide an electrochemical reaction system that is effectively self-cleaning, resistant against coating of electrodes, or both. It would be a further advance in the art to remove the common practice of de-rating systems according to their actual capacity compared to their engineered capacity.

Moreover, their capacity over time degrades far below their initial capacity. For example, the frequent and necessary process of maintenance or disassembly for cleaning is so ubiquitous that systems are de-rated so that they may be properly sized by being over-designed. This effectively amounts to reducing the expectations of performance in place to comport with reality. Between actual disassembly for cleaning at periodic times, the intervening performance degradation must be properly accommodated.

Thus, it would be a great advance in the art to provide a system that had a consistent, high fraction of available operational time. It would be a further advance to effectively eliminate routine cleaning if possible.

If possible, it would be a great advance in the art to relegate maintenance to replacement of consumed sacrificial anodes, in due course, rather than cleaning those or other electrodes. It would be another advance in the art to develop a process for design of a system that operates within a set of operational parameter values that effectively preclude cleaning as a requirement.

It would be another advance in the art to develop a process for design, and a system so designed, that result in uniform sacrificial donation of ions from a surface of a sacrificial anode.

It would be an advance to provide a consistent measure of efficiency over time and predictability of replacement.

It would be another advance in the art to create a system, and a method for designing systems, that would be responsive to variations in the incoming waste water treated. For example, different petroleous formations have inherent geological differences, resulting in different chemistries for the surrounding water or production water. Thus, waste water treatment may be subject to large variations in the constitution of heavy metals and other constituents such as dissolved solids, salinity, and the like. Accordingly, it would be an advance in the art to provide a system and a method for designing systems that can be responsive to changes in the constitution of incoming waste water without altering the reduced maintenance, operational efficiency, and so forth.

Another advance in the art would be to provide an increased efficiency of precipitation of heavy metal compositions separated out from the waste water stream. In this regard, it would be a further advance in the art to provide a system for designing a predictable performance of precipitation of the extracted materials. This may be expressed as a precipitation efficiency of a system.

BRIEF SUMMARY OF THE INVENTION

An alternative to electro-coagulation isolates ion generation and precipitation of target ions from one another. For example, each is relegated to a subsystem optimized for accomplishing its own objective (e.g., ionization and precipitation, respectively) to the virtual exclusion of others. Performance of all functions is improved, electrical efficiency is improved, power use is reduced, heating of treated fluids is reduced or eliminated, and separation of target ions (e.g., heavy metals) is improved.

Conventional pitting, channeling, variations in surface texture, and the like that typically result from coating are eliminated. Stated another way, coating is eliminated, so the effective degradation of a sacrificial anode is a direct function of uniform reduction of thickness. In the case of a cylindrical sacrificial anode, the radius uniformly decreases smoothly along the entire length and about the entire circumference during operation.

In one method of reclamation of a flow of waste water, a system of pumps control head, which thus controls pressure, velocity, mass flow rate, and the turbulence that will exist in conduits carrying the fluid. Plug flow is enforced within at least the ion generator. Along the entire length thereof, plug flow exists, meaning that the Reynolds number is well into the turbulent region, well beyond any critical zone in the transition region. Typically this involves Reynolds numbers much greater than five thousand, typically greater than ten thousand, and often on the order of twenty thousand to thirty thousand.

Plug flow represents a hyper-turbulent condition at a Reynolds number well above the critical zone range. The typical critical zone of the transition region for the Reynolds number is between about two thousand and five thousand. Below a Reynolds number of about one thousand is very stably laminar flow. That is, flows at Reynolds number values below one thousand are well into the laminar range and not susceptible to changes with disturbance. Similarly, flows having a Reynolds number greater than five thousand are turbulent. At a Reynolds number greater than ten thousand, a flow is well into the turbulent region, and incapable of dropping back to a laminar flow absent a radical change in operating parameters, such as the velocity, diameter, significant length, or the like.

Thus, plug flow is maintained along the entire operating length of an anode in a cell of an ion generator in accordance with the invention. Plug flow indicates that a velocity profile is substantially all at a single value of velocity, except in a very thin layer near a wall, such as from about one percent to about ten percent of the overall available diameter or available radius.

Similarly, the flow is unidirectional throughout an ion generator. The bulk flow direction is axial, not twisting, turning, reversing, crossing, or the like in other directions.

A system in accordance with the invention may provide for recirculation. The system may recirculate certain output water that has already been cleaned, in order to control the concentration of incoming water to be remediated. The circulation pump may be controlled by a control valve which effectively trims the head (pressure, typically measured in terms of a height at some standard acceleration, such as the value of gravity) that results from the circulation pump.

A main pump delivering fluid to be remediated will typically not overcome a recirculation pump through a control valve. The recirculation pump, when throttled back with the control valve, cannot overcome or dominate the flow from the main drive pump. Thus, the flow from both pumps may be combined in order to pass into an ion generator at a condition of concentration (constitution of water with its constituent ions and in total dissolved solids) that can be effectively handled by the system.

An ion generator may include a conduit in which a hyper-turbulent, plug flow operates in a unidirectional mode, progressing axially along the conduit. Effectively no radial component nor back component to bulk velocity exists. Near the wall thereof, the hydrodynamic boundary layer will provide some slight amount of recirculation as understood in boundary layer theory. However, this is not even a significant portion of the volumetric flow rate (cubic feet per minute or liters per minute).

In one embodiment, stagnation points are not permitted along a conduit in an ion generator. The flow is preferably directed through a cross-sectional area that has little or no change in area, dimension, shape, or the like along the length thereof.

Necessarily, certain guides may be required in order to position an anode along a central axis of a conduit. These may occasion a slight amount of interference with the cross-sectional area, but will add to turbulence. They will not tend to make the flow any more nearly laminar, nor generate stagnation eddies. By stagnation eddy is meant a region where flow may actually come to a stop or reverse in the axial direction or main direction of flow.

The Reynolds number is greater than the critical zone value at all significant points within the conduit. This is typically from about two to about six times the value of Reynolds number in the critical zone of the transition region's end (maximum value). Likewise, there may be a single transition area at an entrance to the conduit, wherein fluid may come in perpendicularly or from a conduit of another diameter in order to feed into a particular cell of an ion generator. Similarly, a single transition at the exit will typically be downstream of the sacrificial anode. That anode may be configured as a cylindrical rod passing axially along the center of a conduit carrying the fluid to be remediated. The rod furnishes ions as the sacrificial anode.

The hydrodynamic boundary layer near any walls adjacent to the hyper-turbulent flow provides mechanical shear selected to overcome weak chemical bond forces, and specifically Van der Waal's forces. Only ionic bonds may survive the turbulence and the laminar shear (at a solid boundary) extant throughout the lumen of a conduit in the generator.

Tripping devices, or trippers may be used in order to trip flows in regions where the possibility of reduced Reynolds number may exist. Textures on surfaces, ridges, dams, disruptions, or changes in direction at highly localized locations and the like may trip a laminar boundary layer, turbulent boundary layer, or both in order to maintain thorough, actual turbulence.

Calculation and design of a system may require assessment of hydraulic diameter of a conduit, selection of the velocity, investigation and accommodation of fluid properties, minimizing a hydrodynamic boundary layer, maintaining a constant axial cross-sectional area of flow, and the like. It may benefit from maintaining all flow parallel to an anode surface, such that net ion migration or diffusion exists only perpendicular to the anode surface. This results in an effective electrodynamic machining process actually carrying ions away from the contact surface of an anode in the conduit of a cell of the ion generator.

The hydrodynamic boundary layer is minimized by the hyper turbulence of the flow. Meanwhile, the diffusion boundary layer is minimized in that it is coincident with the entire laminar portion of the hydrodynamic boundary layer, and then may extend into a micro eddy portion of the transition region to turbulent flow. For example, transition from laminar flow to turbulent flow at a solid boundary will typically involve micro eddies that have a circulation component while still moving axially along the path of the boundary.

Thus, diffusion is minimized in the direction toward the anode throughout the diffusion boundary layer. The flow of current, drawing electrons from any metals in the flow will result in a plethora of ions (a comparatively high concentration) near the surface of the anode. By matching the mass transport rate of convective processes carrying ions out of the diffusion boundary layer and into the bulk plug flow of the conduit will assure that no effective precipitation can occur in the ion generator.

Rather, sacrificial metal ions are driven into the bulk flow by a flux, effectively approaching saturation with respect to the maximum current output by a current source driving the ion generator. Meanwhile, a radial flow of ions is matched with an axial flow of fluid with thorough and immediate mixing of ions into the bulk flow. Thus, only in a core region near the anode is any diffusion gradient extant, and not actually distinguishable, as a practical matter. That is, the hydrodynamic and diffusion boundary layers are simply too thin to include a significant portion of the flow. The constant, radial, cross-sectional area provides a diffusion per unit length that is substantially constant and thus represents a linear curve along the entire length of a cell of the ion generator.

Moreover, a unidirectional, axial, mechanical load on the anode results from centering the anode in a seat of a holder or guide engineered for the purpose near the exit end of the cell. Meanwhile, another guide positions the upstream end of the anode near the flow entrance within the conduit. The conduit itself, meanwhile, operates as a cathode.

There is no need nor benefit to alternating the current flow or the roles of the anode and cathode. There is no benefit to swapping polarity. A system in accordance with the invention precludes coating out any significant precipitants on the anode. There is no need to try minimizing that coating, nor trying to reverse that coating, by acidifying the fluid in order to scavenge hydroxides from the fluid.

In one embodiment of an apparatus and method in accordance with the invention, no manipulation of the polarity, modulation, reversal, change of magnitude, or the like is required in order to avoid precipitation in the ion generator. Rather, isolation of precipitation is physical. The ion generator has a separate device, containment, and flow path from a precipitation reactor. They occupy no coincident physical space. Moreover, the hydrodynamic, hyper-turbulent flow regime within the ion generator precludes precipitation and precludes any agglomeration of precipitants. The hydrodynamic shear precludes any agglomeration of ions under weak forces, such as Van der Waal's forces. Moreover, no acid need be added to the water to be treated upstream from the ion generator. No hydroxide ion scavenging is necessary. Rather, the availability of hydroxide ions need not be manipulated nor controlled. Hydrodynamic effects simply assert control over the agglomeration process, thus effectively precluding them from the ion generator.

Stated another way, the hyper-turbulent flow and the comparatively high rate of shear in the hydrodynamic boundary layer will preclude agglomeration of precipitants, and even tend to reverse any occasional, statistically random, chance precipitation of constituents. This is because the availability of hydroxide ions, heavy metal ions, and sacrificial ions, is so ubiquitous, yet extra charge is not available. This system does not run excess currents similar to electro-coagulation systems.

Thus, a system in accordance with the invention isolates precipitation physically, isolates ion generation from precipitation reactions by hydrodynamic shear, and does not require acid or other hydroxide scavengers in order to manipulate the availability of hydroxide ions to metal ions. Downstream from the ion generator, the addition of flocculating polymers, adjustments of pH in order to optimize the availability of reactants for precipitation in the precipitation reactor, and so forth may be considered and included. The reactor operates in the laminar flow regime, and may even be completely quiescent. Stagnation is not necessarily general. A certain amount of mixing may be beneficial to provide availability of ions to one another for reactions. Nevertheless, the laminar flows that have a Reynolds number value less than half that of the critical zone (e.g., less than half of about two thousand) may be considered to be well within the laminar flow regime.

One may analyze water, and create a report. One may analyze ion concentrations and types based on the report of inductively coupled plasma (ICP), chromatography, or other testing systems. Accordingly, one may determine by calculation of electrons required for ionization a current limit. For example, the numbered ions times the charge per unit is the current required to remove all those ions at their charges. The sum of all species of ions provides the total charge.

That amount of charge per unit volume, and the volumetric flow rate, will control the amperage required. Amperage is the current flow of electrons needed per unit of time to match the reaction of the number of ions passing per unit of time through the precipitation reactor portion of a system. Electrical energy need not be devoted to overcoming resistance of coatings. Very little energy is wasted as heat.

The amperage is a function of ion generation, and is largely independent from any resistance. Typically, the only resistance to be overcome is that inherent in thermodynamic processes of ionization. The electrical energy need only be sufficient to break bonds of metals with electrons, in order to create metal ions. There is no need to provide excessive additional current. Energy is needed to the extent that thermodynamics requires the minimum of losses required by its first and second laws for a process to occur.

Meanwhile, a system does not need the amount of electrical energy common in the prior art (e.g., Electrocoagulation or EC). Prior art systems need to overcome the electrical resistance of dielectric coatings of precipitants on electrodes, such as a sacrificial anode. Moreover, electrical energy is required for electrophoresis of ions through the thickened prior art fluids. Here, mechanical mixing provides all the diffusion required outside the boundary layers.

A system in accordance with the invention may optimize a curve of operation representing electrical conductivity (proportional to ion concentration) as a function of current in a separate ion generator. The mass transport (transfer) limit may be calculated initially from the principles of heat and mass transport as well as chemical diffusion through boundary layers of fluids. A definition of a mass transport limit and an electric current limitation will establish an envelope within which the operation of curve will be found. It is typically desirable to improve the operational curve toward the limits of the envelope established by the current limit and the mass transport limit.

The system may also track independent variables, which include current, flow, and chemical constitution. Typically, current, flow, and, to a lesser extent, the constitution of the fluid may be manipulated by individual controls. The constitution may be manipulated by diluting an incoming fluid stream to be remediated. On the other hand, flow and current are typically controlled almost directly. As a practical matter, current may be controlled by a feedback control loop on a current generator between the cathode and anode.

The system may measure and track the dependent variables such as electrical conductivity, temperature, and pH within the flow of a fluid. The system may accordingly adjust the operation of the curve within the mass transport limitation and the current limitation of the system. Sensors may measure conductivity variations as current is increased and reduced. Accordingly, process controllers may evaluate the comparison of slopes, and determine whether the benefits of increased current will provide sufficient increase in ionization of anode metal. The system may test the slope operating of the curve at various conditions and thereby limit the processes to avoid operating in a fouling region in which too much current applied to an anode results in coating out of precipitants on the anode.

In certain embodiments of apparatus and methods in accordance with the invention, an ion generator may be fed by a current source to treat a flow of incoming water. In certain embodiments, a precipitation reactor may be connected to receive the output of the ion generator. As a practical matter, it has been found effective to separate the ion generator from a precipitation reactor in order that the processes of precipitation, flocculation, and the like be completely isolated from the generation of ions.

In certain embodiments, it has been found most effective to maintain a high-velocity, well established, turbulent flow throughout the ion generator. Thus, the electrochemical reaction driven by the current source is effective to generate large (comparatively) masses of metal ions from a sacrificial anode into a very turbulent flow (Reynolds number well into the turbulent region, and consistently well away from any laminar-to-turbulent transition).

It has also been found effective to rely on a channel or lumen that is annular in shape. The sacrificial anode is best made a cylinder axially aligned in a cylindrical tube acting as the cathode. Thus, the sacrificial anode is completely surrounded by treated fluid. The high velocity, high turbulence, and generalized mixing of plug flow results in a rapid carriage of ions into the bulk of the stream. This also causes a minimization of hydrodynamic boundary layer, diffusion boundary layer, and any tendency to coat out the anode.

A flocculent polymer may be injected into the flow between the ion generator and the precipitation reactor. This provides several benefits. For example, the precipitation reactor is separate from the ion generator. The flocculent source provides a source of flocculating polymer. Thus, the precipitation reaction and flocculation of precipitants cannot be effective, and cannot overcome the turbulent flow and boundary layer shear within the ion generator.

Moreover, in contrast to prior art systems, separating the precipitation reactor from the ion generator provides for a flow in the precipitation reactor that may range from quiescent to laminar flow. In electro-coagulation systems, ion generation and precipitation reactions commonly compete with one another in the same tank. Thus, prior art systems would damage the flocculation process if turbulence were allowed. Meanwhile, such quiescence or laminar flow in the presence of an anode will increase hydrodynamic boundary layers, and the diffusion boundary layer, both resulting in higher rates of coating out and fouling.

In a system and method in accordance with the invention, ion generation takes place in an environment optimizing the rate of ion creation, and minimizing the processes or effects contributing to coating. Meanwhile, the precipitation reactor is optimized specifically for flocculation. Turbulence is effectively eliminated by maintaining the flows well within Reynolds numbers below turbulent transition. Moreover, in certain embodiments, the Reynolds number is often double the Reynolds number at the high end of the critical zone of the transition region or greater.

The Reynolds number in the precipitation reactor is often in the range of half the beginning critical zone of the transition Reynolds number. This may be a value of one thousand or less. Thus, each of the ion generator and precipitation reactor may be optimized to maximize the effectiveness of the process to which it is dedicated.

In order to provide low Reynolds numbers (e.g., slow to quiescent flows) with some modicum of mixing sufficient to promote precipitation reactions, the precipitation reactor may include elements such as baffles, channel obstructions, flow path variations, and the like. Gates, and the like may maintain laminar bulk flows while still providing the exposure required to create molecular availability or atomic availability for reactions.

Typically, the actual separation of flocculated precipitants may be conducted in a clarification unit. Typical clarification units include induced gas flotation (IGF), dissolved air flotation (DAF), settling tanks or settlers, or the like. Typically, such systems rely on time, gravitational separation of heavy materials from lighter materials, and so forth. Typically, the reference in such systems is to "scraping" or separating off the lighter materials appearing near the top of a processing tank, while augering out sediments from the bottom of such tanks. A water outlet therebetween removes the water separated from the contaminants.

A post processing unit may be added. For example, a distillation process, reverse osmosis, activated carbon filter, or the like may be placed in line with the output from a clarification unit. The post processing unit may thus return the treated waste water to a condition suitable for subsequent use. Such subsequent uses may include, for example, irrigation, drinking water, process water, and so forth.

In some embodiments, a certain amount of the water output from the clarification unit may be recycled in a bypass or circulation loop. The circulation loop may be driven by a circulation pump restricted by a control valve in order to control incoming concentration by providing a certain amount of make up water into the ion generator. An alternative is to use fresh water or a separate source of clean water to dilute the concentration of a particular incoming waste water stream.

In the petroleum production industry, commonly called the oil and gas industry, water may simply be reinjected into an injection well drilled for the purpose. Thus, the production water removed from the earth as a byproduct of petroleous production may be reinjected into another dry well, below underground aquifers Notwithstanding the fact that the water is reinjected, it is desirable that the water not contact aquifers. Nevertheless, the purification requirements are such that the possibility of eventual contact with aquifers is still kept in mind. For example, heavy metals are removed permanently.

As a practical matter, the injection wells are typically drilled to a depth consistent with petroleum production. In the oil and gas industry, the removal of heavy metals and compounds of heavy metals also serves to prevent fouling of the injection well itself, the bores as well as the formation into which the water is injected. Otherwise, over time, fouling will eventually block access and destroy the utility of an injection well.

Similarly, water used for formation fracturing (commonly referring to as fracking) also has environmental limitations as well as fouling concerns. Thus, removal of heavy metals and their compounds reduces fouling and increases the longevity of a particular well and a formation.

In another system and method in accordance with the invention, a control scheme has been developed by which the system may be operated, designed, trimmed, and monitored. In certain embodiments, a current limit is established, as well as a mass transfer limit. These correspond, respectively to the electrochemical reaction rates available at the surface of a sacrificial anode and the diffusion and mass transfer processes due to hydrodynamic and diffusion boundary layers within the system. Accordingly, it has been found that a system may be controlled to optimize capital expenditure or balance capital expenditure on systems against the operating costs, such as power costs. Likewise, maintenance costs may be so balanced or optimized. Fouling may be effectively eliminated by controlling a system within parametric values in accordance with the apparatus and method.

The operating envelope may be bounded by the current limit and mass transfer (mass transport) limit. These govern the relationship of ion concentration (as reflected in the electric conductivity) as a function of the current input for a sacrificial anode.

By maintaining values of operational parameters within the envelope defined by the current limit and mass transfer limit, an operational limit on performance may be established. For example, by tracking a suitable dependent variable, such as electrical conductivity of the waste water stream, the effectiveness of reactions along the path of that stream may be tracked and controlled.

In this example, an initial period of ion generation may effectively degenerate to a linear curve that may be relied upon consistently. Meanwhile, the decay of electrical conductivity as the precipitation and flocculation processes proceed may also be measured, characterized, and parameterized to provide suitable predictions of performance.

In fact, depending on whether the incoming stream is effectively clean water with heavy metals in it, brine containing heavy metals, or some combination containing only metals, only salts, or the like, certain operational parameters may be established, and an operating envelope may be defined. These operating envelopes have been established by experiment and demonstrated to be operative.

In certain embodiments, a quick release system for replacement of anodes has been developed to provide rapid replacement of individual cells. Taking a cell offline, minimizes downtime for replacement of anodes. The only operational degradation of that anode is consumption. Current may be maintained at a constant value regardless.

In order to break an emulsion or coalesce small liquid droplets in a dilute dispersion, an alternate process may pass the emulsion or dilute dispersion through the EcoReactor system. Since aluminum is not required in the process, the current between electrodes may be turned down so low the potential of the electric field (voltage) is low enough that no aluminum is oxidized into ions.

Alternatively, the process may use an anode and cathode of material more noble than aluminum (e.g., stainless steel, gold, etc.) with higher voltage. A less noble metal may also be used if a more noble metal is electroplated or sputtered on it to prevent corrosion or oxidation.

Such a device acts as a coalescer (EcoCoalescer). As far as process operation, it operates very similarly. The device does not remove heavy metals, and has significantly less onerous maintenance requirements (e.g., no anodes to replace). Operation costs are on the order of 70% less as well.

Potential candidate emulsions or dilute dispersions are heavy or light phase effluent from a liquid/liquid separator (e.g., centrifugal, gravity, etc.), drilling mud, used motor oil, used lube oil, dilute silica in water mixtures, effluent from a flotation or settling operation, etc.

When the emulsion or dispersion passes into the coalescer, it experiences an electric field gradient. The electric field gradient causes electrophoretic movement of the droplets and distortion of the droplets. This movement, distortion, or both will cause the small, dilute droplets to coalesce more quickly due to closer proximity or favorable reduction, distortion, or both of the zeta potential. This method of coalescence works with any droplet or particle where the droplet or particle has an unbalanced electric charge (e.g., oil, clay, etc.) or with any droplet or particle where an unbalanced electric charge may be induced (e.g., oil, silica, etc.).

It is important in the design and operation of the coalescer that the flow be such that the residence time of the fluid be sufficient for coalescence to occur, but not so long as to waste power. The flow also needs to be quiescent enough not to break up any coalesced droplets but not so quiescent as to require undue capital costs for equipment size.

It has been found that streams or flows of water having extremely high dissolved solids content, such as greater than 150,000, and especially over 200,000, parts per million may have excessively reduced electrical resistance (increased conductivity) within the stream itself. Accordingly, it is difficult to maintain the voltage necessary between an anode and a cathode to drive ions from the sacrificial anode. In order to increase resistivity along the electrical path of ions and electrons passing between the anode and cathode, it has been found effective to modify the surface area available to participate in the electrical exchange.

One method for increasing the effective resistance due to low electrical resistivity is by reducing the area on the anode. This may be done by masking a portion of the anode until after the anode has been eroded (sacrificed) sufficiently to increase the distance between the anode and the cathode to a value suitable to maintain a suitable voltage (typically greater than two volts across two inches). Masking techniques may involve films, cylinders, coatings, various plastics or dielectric materials, and the like used to coat a portion of an anode, a cathode, or both. Masking may be accomplished in stages. In alternative embodiments, masking of the cathode may also result in additional reduction of effective conductivity and therefore increase the resistance and voltage between the anode and cathode.

In yet another embodiment, masking may be done by hydrodynamic means, such as a curtain of extremely fine bubbles generated to pass upward along the hydrodynamic boundary layer attached to the anode or to the cathode. The net effect of the curtain of the bubbles is to increase the physical path length required for an ion to traverse between the anode and the cathode.

The air or other gas in each bubble represents an effective dielectric region. Thus, ions must pass through the minimized, residual liquid surrounding each bubble. This creates a tortuous path through the bubble curtain. Increasing resistance and effective resistivity increases the voltage upward towards that required to drive ions from the sacrificial anode toward the cathode.

A method for removing metals from a flow of liquid may include providing a flow of a liquid containing target ions of a target metal. Providing a cathode, as a conduit, and an anode, formed of a sacrificial metal passing axially through the conduit, leaves an annulus therebetween. The anode is capable of providing sacrificial ions of the sacrificial metal.

Limiting a surface area of the anode exposed to the flow increases resistance by masking a portion of the anode. Flow through the conduit receives sacrificial ions from the anode, released into the flow by applying an electrical potential voltage between the anode and cathode.

Reaction between the target ions and the sacrificial ions within the annulus is blocked by maintaining a comparatively thin, (compared to laminar flow) hydrodynamic (liquid) boundary layer therebetween resulting from hyper-turbulence in the annulus. Liquid shear forces are easily capable of overcoming "weak forces" (e.g., Vander Waal's forces) between products of reaction that may react in the annulus, by the hyper-turbulence. By thus limiting flocculation, in the annulus, by precipitants (reacted constituents) comprising the sacrificial ions and the target ions the hyper-turbulence in the bulk of the flow in the annulus does double duty. It keeps boundary layer thinned and close to the anode, but thoroughly shears and mixes the bulk (vast majority) of the flow.

This amounts to resisting precipitation of reactants composed of the sacrificial ions and target ions by mechanically isolating the target ions from the anode by maintaining a hydrodynamic boundary layer of the flow corresponding to a hyper-turbulent condition in the flow. Then, the flow continues resisting flocculation of reactants by a combination of resisting reaction of the target ions and sacrificial ions and by overcoming weak forces of aggregation of reaction products by maintaining a hyper-turbulent condition in the annulus and a boundary layer corresponding to hyper-turbulence proximate the anode. This may be called "plug flow" since the volumetric flow rate is so high and so very turbulent that it flows at a single bulk velocity across the entire annulus except in the very thin boundary layer.

Controlling the quantity of sacrificial ions exposed to the flow may also occur by controlling the area of the exposed surface of the anode or of the cathode. This results in maintaining a migration of the sacrificial ions into the flow by increasing the resistance ($V=IR$) and electrical potential (voltage) for any given current (I) between the anode and cathode. Voltage will continue to rise in response to receding (eroding, sacrificing ions) by the anode, thus increasing its distance away from the cathode.

Masking is temporary. Removing a portion the masking from the anode may be done as a maintenance step in response to at least one of a reduction of the surface area of the anode due to migration of sacrificial ions, a rise in the electrical potential required to maintain a current flow between the anode and cathode at a pre-determined value, and a reduction in electrical conductivity through the flow.

An apparatus for removing contaminants, comprising metals, from a flow of liquid may include an inlet connectable to and capable of introducing a flow of a liquid containing target ions of a target metal. A cathode, operably connected to the inlet may act as a conduit capable of conducting the flow. An anode, formed of a sacrificial metal, passes axially through the conduit to form an annulus therebetween. The anode is capable of providing sacrificial ions of the sacrificial metal into the flow;

A mask is capable of controlling exposure to the flow of a surface area of the anode by selectively covering a portion of the surface area. An electrical source, of electrons as an electrical current at an electrical potential (voltage), is capable of controlling at least one of the electrical current and the electrical potential, between the cathode and the anode, at a pre-determined value.

The liquid typically comprises water and dissolved solids as contaminants, including at least one of a hydrocarbon, other organic material, a heavy metal, an earthen material, a surfactant, a chemical waste product. At least one of the contaminants contains the target metal ions. The sacrificial ions are reactive with water in the liquid to form a dipole capable of collecting thereon a target-metal-ion-bearing contaminant as a target contaminant.

A reactor tank is operably connected to receive the flow from the cathode (conduit) and flows quiescently to be capable of reacting a majority of the sacrificial ions with water to form dipoles. A precipitator is even more quiescent, perhaps almost stagnant, to be capable of flocculating the dipoles with the target contaminants as a flocculent. Later a clarification unit receives the flocculent and removes it from the flow. A post processing unit is capable of filtering out from the flow suspended solids of a predetermined size.

One method of removing contaminants by flocculation based on target metal ions in a flow, includes providing a cathode, as a conduit capable of conducting a flow comprising water carrying contaminants containing target metal ions; providing an anode, formed of a sacrificial metal as a source of sacrificial ions, the anode forming an annulus by passing axially through the conduit; and limiting a surface area of the anode exposed to the flow by applying a mask onto a portion of the anode.

The method may direct the flow through the annulus while imposing an electrical potential between the cathode and anode. The sacrificial ions are generated at the anode and released into the flow in response to the electrical potential. The desired value of the electrical potential may be controlled in response to an increase in distance between the anode and cathode, resulting from erosion and migration of the sacrificial ions into the flow. One way to do so is by exposing an additional surface area of the anode by removing at least a portion of the mask in response to the exposed anode decay or erosion, which increases the electrical potential to a value about that required to maintain the migration of the sacrificial ions.

The method may be improved by resisting interaction between the target ions and the sacrificial ions within the annulus by maintaining a boundary layer therebetween resulting from hyper-turbulence in the annulus. This also results in hydrodynamic shear forces in the bulk flow overcoming weak forces (e.g., Vander Waal's forces) between products of reaction of the sacrificial ions as sacrificial dipoles and target-ion-bearing contaminants as target contaminants in the annulus, as a consequence of the hyper-turbulence. This results in limiting agglomeration into flocculants by the sacrificial dipoles and the target contaminants through a combination of resisting reaction of the target ions with the water in the flow and the overcoming of the weak forces required for such aggregation (agglomeration).

The method may control quantities of sacrificial ions exposed to the flow by controlling the area of the exposed surface of the anode. Masking maintains voltage required to initiate migration of the sacrificial ions into the flow by increasing the electrical potential between the anode and cathode by limiting available area and distance. Later, increased distance develops between the anode and cathode as the anode erodes (sacrifices) mass.

As voltage increases or tends to go beyond the voltage of the current sources removing a portion the masking from the anode reduces voltage in response to at least one of a reduction of the surface area of the anode due to migration of sacrificial ions, a rise in the electrical potential required to maintain a current flow between the anode and cathode at a pre-determined value, and a reduction in effective electrical conductivity (increased total resistance) across the flow in the annulus.

BRIEF DESCRIPTION OF THE DRAWINGS

The foregoing features of the present invention will become more fully apparent from the following description and appended claims, taken in conjunction with the accompanying drawings. Understanding that these drawings depict only typical embodiments of the invention and are, therefore, not to be considered limiting of its scope, the invention will be described with additional specificity and detail through use of the accompanying drawings in which:

DETAILED DESCRIPTION OF THE PREFERRED EMBODIMENTS

Figure 1:
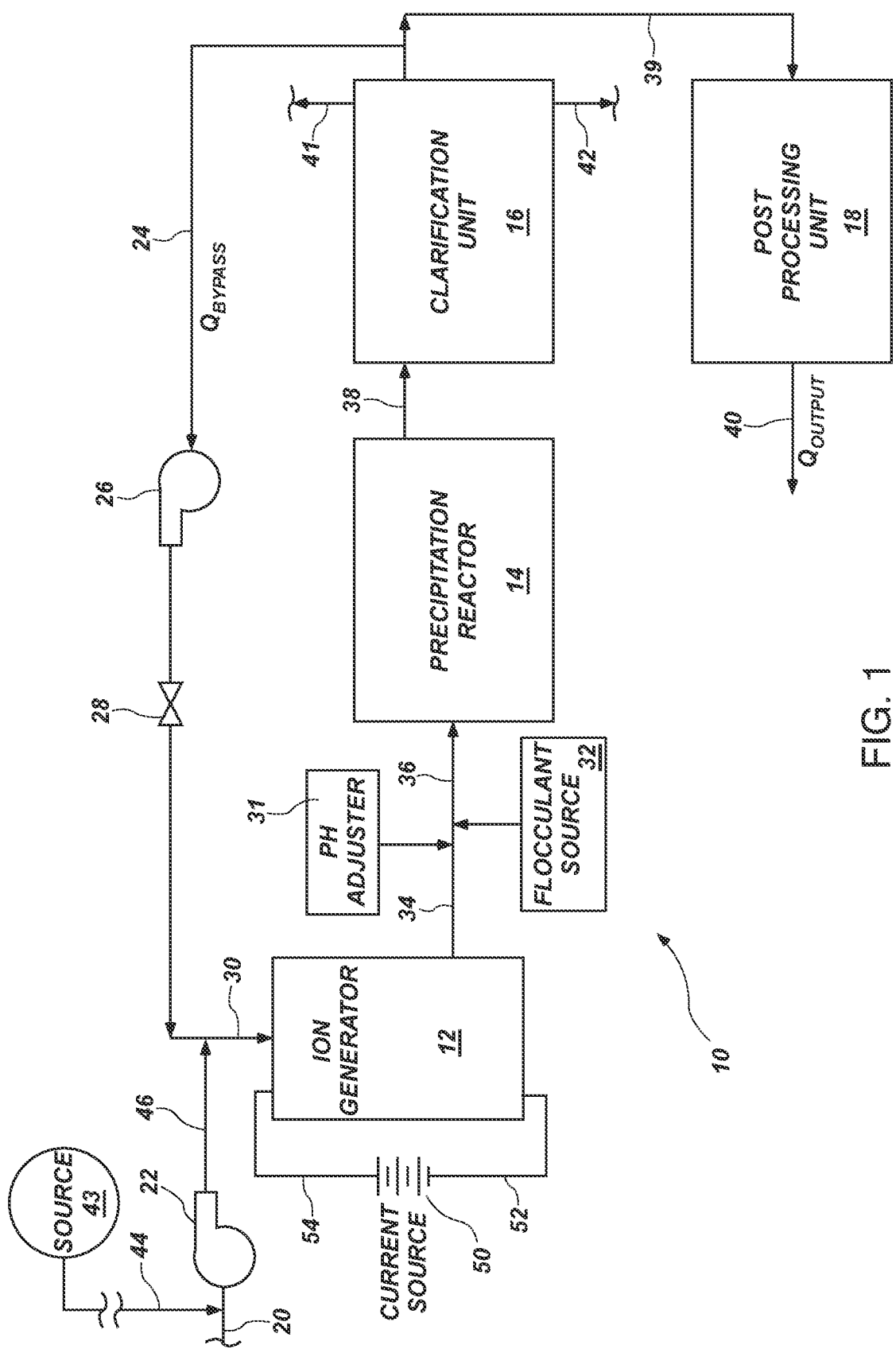
FIG. 1 is a schematic block diagram of an apparatus and process in accordance with the invention.

It will be readily understood that the components of the present invention, as generally described and illustrated in the drawings herein, could be arranged and designed in a wide variety of different configurations. Thus, the following more detailed description of the embodiments of the system and method of the present invention, as represented in the drawings, is not intended to limit the scope of the invention, as claimed, but is merely representative of various embodiments of the invention. The illustrated embodiments of the invention will be best understood by reference to the drawings, wherein like parts are designated by like numerals throughout.

Referring to FIG. 1, a system 10 in accordance with the invention may include an ion generator 12 responsible for generating ions of a metal anode. The anode referred to as a sacrificial anode, delivers ions into a solution of waste water to be remediated.

Waste water may arise in a variety of industrial circumstances. Tail water from mining, production water from petroleous production, production water from coal-bed methane production, industrial process waste water, irrigation tail water, city sewer systems and surface drainage, and the like may all give rise to water containing contaminants. Certain biological contaminants are handled by conventional mechanisms. In accordance with the invention, a principal contaminant is heavy metals.

A system 10 in accordance with the invention may include other elements (not shown) responsible for handling volatile organic compounds (VOCs), other organic materials, biological matter, or the like. Meanwhile, salinity may be another issue to be addressed by additional mechanisms or ignored, depending on final disposition such as Re-use versus Re-injection. In the illustrated embodiment, the principal concern is heavy metals that are difficult to remove from water streams. The difficulty is related partly to the chemistry of those metals, and partly to the trace amounts in which they exist. Efficiently processing such constituents out of a waste water stream may be problematic, and has historically been so.

Thus, a system 10 in accordance with the invention may be augmented by additional components responsible for managing VOCs, organic compounds, salts, biological compounds, and the like. Alternately, some may be permitted to remain.

Downstream from the ion generator 12 may be located a precipitation reactor 14. The precipitation reactor 14 is responsible for agglomerating various compounds made up of sacrificed metal ions from the ion generator, along with hydroxide ions derived from the water itself, and other heavy metal ions. In general, the precipitation reactor 14 may include flocculation by addition of suitable compounds discussed hereinbelow (e.g., polymers).

A precipitation reactor 14 differs from an ion generator 12 in a significant manner. In contradistinction to prior art systems, such as, for example, electro coagulation (EC) systems, whether open or closed as to containment of the treated fluids, the ionization process is isolated to the ion generator 12. The precipitation process is isolated to the precipitation reactor 14, for all practical purposes.

Ionization, reaction, and the like as chemical processes, are inherently statistical in nature. Thus, at any given moment, any particular chemical atom or composition may enter into a reaction with another. Nevertheless, as a statistical probability, such processes typically occur at an appreciable, significant, or measurable rate only under certain conditions. Thus, the ion generator 12 is specifically designed to provide conditions of highly turbulent flow (well above the critical zone of the transition Reynolds number range).

In contrast, the precipitation reactor 14 is maintained at a quiescent or at most stably laminar flow (e.g., a Reynolds number of much less than the initiation of transition to turbulence, and typically even on the order of half that value).

The ion generator 12 is designed, described, defined, and operated to provide minimal residence time. One reason this is so is that the ion generator 12 is driven electrically, as a function of flow rather than depending upon or balancing other processes present. For example, the ion generator 12 is driven at a high velocity, very high Reynolds number, in a highly turbulent plug flow. This ensures a minimal boundary layer at all surfaces, and in both hydrodynamic and diffusion boundary layers.

In contrast, the precipitation reactor 14 may include baffles, weirs, dams, obstructions, gates, serpentine paths, or the like. These may provide a certain amount of mixing at very low Reynolds numbers (well below values of two thousand, and frequently less than half that value) in order to assure laminar flow, agglomeration of molecules and associations of ions by "weak forces" that might otherwise be disrupted by any effective turbulence in the flow. This supports flocculation, development of gels and polymeric reactions, absorption of water molecules into flocculating polymers, and association of large groups of ions including metallic ions from the ion generator 12 and the constituent heavy metals, and so forth.

Thus, the ion generator 12 need not be designed to tolerate nor foster the weak forces, such as Van der Waal's forces. In direct contrast, the precipitation reactor 14 by its well-laminarized to quiescent flow exactly fosters flocculation, agglomeration, chemical reaction, precipitation and so forth.

In certain embodiments, a clarification unit 16 may be a settling tank that simply provides space and time for materials to separate in a quiescent environment. Typically, sediments representing heavy precipitates may be augured out of the bottom portion of such a unit 16 while lighter compositions and mixtures may be "skimmed" from the upper reaches thereof.

A clarification unit 16 may be any of several suitable types. For example, an induced gas flotation system (IGF) may foster agglomerating reactions of various ions that will include (e.g., scavenge) the heavy metals ions desired to be removed from the waste water. To that end, an IGF system, or a dissolved air flotation system (DAF) may operate similarly.

For example, these systems may foster flocculation and flotation of certain compositions, resulting in a froth or gel that may be separated, skimmed, or "scraped" from near the surface of a tank of a clarification unit 16. By the same token, smaller particles that are not involved in flocculation, and thus have not entrained air, or trapped air or other lighter species, may simply drift downward to the bottom of such a tank, becoming sediment. Various types of scrapers may operate near the top of such a tank in order to remove lighter compounds and mixtures. Meanwhile, augers and the like may remove heavy sediments settled out at the bottom of the clarification unit 16.

A post processing unit 18 may provide additional steps in remediating a flow. Typically, post processing units 18 may include desalinization, reverse osmosis, and other types of purification processes. Such processes executed by post processing units 18, which may be included as one or more individual process units 18, are typically directed to preparing a remediated stream for its specific use.

For example, reinjection of production water from petroleous production does not require removing salt. Thus, brines are often suitable for reinjection. Nevertheless, if water is being prepared for irrigation, culinary purposes, or the like, then desalinization and other processes may be included in a post processing unit 18.

Any type of post processing 18, including those referenced in the prior art as final "polishing steps" or processes may be included. The operating specifications will tell what is required as the output of a system 10 in accordance with the invention. Nevertheless, as a practical matter, a system 10 may be used in combination with a variety of other prior art systems, in order to accomplish the functions of those prior art systems. Thus, the existence or utility of such a prior art system does not obviate the utility and special functionality of a system 10 in accordance with the invention.

A major distinction between an apparatus and method in accordance with the invention and prior art systems for removing heavy metals from waste water treatment streams is the isolation of the ion generator 12 in order to maximize ion generation. In contradistinction to prior art systems, there is not a direct balancing, in a single vessel, of the ion generation function of the ion generator 12 and the precipitation reaction processes of the precipitation reactor 14. Rather, each of these is designed, sized, and optimized for its own function, within its own environment, and its own respective, isolated, system 12, 14.

In general, waste water 20 or a feed 20 may be passed into a pump 22 for raising the pressure in a downstream line 46. Typically, the pump 22 may be augmented by a bypass line 24 or recirculation line 24. Herein, one may speak of the line 20, 24, or the flow 20, 24, since is each is connected to the other.

In general, a bypass flow 24 or bypass line 24 may be driven by a pump 26. Typically, a control valve 28 may be set as a resistance against the free flow in the line 24. Accordingly, the pump 26 may actually be set to pump against the resistance of valve 28. A resulting flow is added to the incoming raw water 20 introduced into the ion generator 12 as the flow 30.

The flow 30 may simply be the flow 20 directed into the ion generator 12. Nevertheless, in certain situations, concentration may be desired to be controlled. The bypass line 24 or recirculation line 24 may provide recirculation of part of the output of the clarification unit 16. Thus, the precise concentration may be provided for one of several reasons.

Briefly, some of those reasons may simply be the capacity of the ion generator 12, the capacity of the precipitation unit 14, or the capacity of the clarification unit 16. If concentrations vary, which they often will between various production units and over time, then increases may otherwise overwhelm or overrun portions 12, 14, 16, of the system 10. Instead, the flow 20 may simply be diluted by recirculating comparatively clean (e.g., cleaned) water in the recirculation line 24.

Likewise, the ion generator 12 in accordance with the invention is constructed in a modular fashion such that additional cells 90 may be added to the ion generator 12. They may simply be taken on and off line within a battery of such cells 90 in the ion generator 12. Thus, the capacity of the ion generator 12 may be modular even while online, in order to accommodate rapid variations, need for dilutions, or the like while still maintaining a specified throughput or treatment of an incoming raw waste water stream 20.

The ion generator 12 may be engaged by cells 90 in a modular fashion to maintain a specific throughput rate for a precipitation reactor 14. Rather than tying the capacities of the precipitation reactor 14 and the ion generator 12 together, each may be adjusted to operate according to the parameters or the constitution of the incoming water 20. They may adjust independently from one another, in order to maintain each within its preferred operating envelope at optimal performance.

The line 34 may include a pH adjuster 31 to add an acid or a base into the line 34. For example, acidity may affect reaction rates, solubility of the heavy metal precipitates, or both. Thus, the addition of acid or base in the output 34 of the ion generator 12 may be accomplished, resulting in an adjusted pH in the line 36 entering the precipitation reactor 14.

By the same token, and for similar reasons, a flocculent source 32 may inject certain polymers into the line 34, thus adding to the line 36 additional polymeric materials effective for IGF, DAF, and so forth.

The output 34 from the ion generator will eventually, after augmentation by the pH adjuster 31 flocculent source 32 pass into the precipitation reactor 14. The entire quantity or content of the line 34 will typically pass into the precipitation reactor 14.

The reactor output 38 includes all the content introduced by the output 34 from the ion generator 12, as well as any constituents from the pH adjuster 31 and the flocculent source 32, as modified by reactions and flocculation within the precipitation reactor 14. Therefore, the clarification unit 16 may include not only an output 39 of the cleaned water stream, but an output 41 of the lighter materials removed from the top of the unit 16, and the heavy sediments as an output 42 from the bottom of the unit 16. Thus, after the post processing unit 18 may have further processed the output 39, the final output 40 is the flow of "cleaned" water output from the system 10, and suitable for the designated use.

A current source 50 is electrically connected to the ion generator 12. Each cell within the ion generator 12 receives current through the line 54 (positive charge, in an electrical engineering convention), and electrons in the electrical line 52 (physicist, electron point of view). As a practical matter, the current source 50 may be configured in a variety of forms. Typically, sensors within the ion generator 12, or elsewhere may detect voltage drops or other variations in voltage as a result of changes of conditions. For example, a sacrificial anode may decay with time, increasing distance to the cathode, thus altering the required voltage required to maintain current. Nevertheless, by whatever control mechanism is implemented, of which several are available, the current source 50 generates a current set and maintained at an operational level.

In general, the current source 50 is designed to provide a flow of electrons sufficient to liberate from a sacrificial anode, the metallic ions, according to the charge of each. Thus, for example, in one embodiment, an aluminum rod may act as the sacrificial anode. Accordingly, three electrons are required to liberate an aluminum ion from the matrix of the metal, or the close association with its metallic, atomic neighbors. The current source 50 may be designed to provide that amount of electrical charge (remove that many electrons) required to generate the required number of ions (e.g., aluminum ions). The number of ions released is the number required to support the eventual precipitation of the requisite number of incoming heavy metal ions. The current and sacrificial ions balance the reaction constituting the incoming flow 20. Both types exit the ion generator 12, then react in the precipitation reactor 14.

Figure 2:
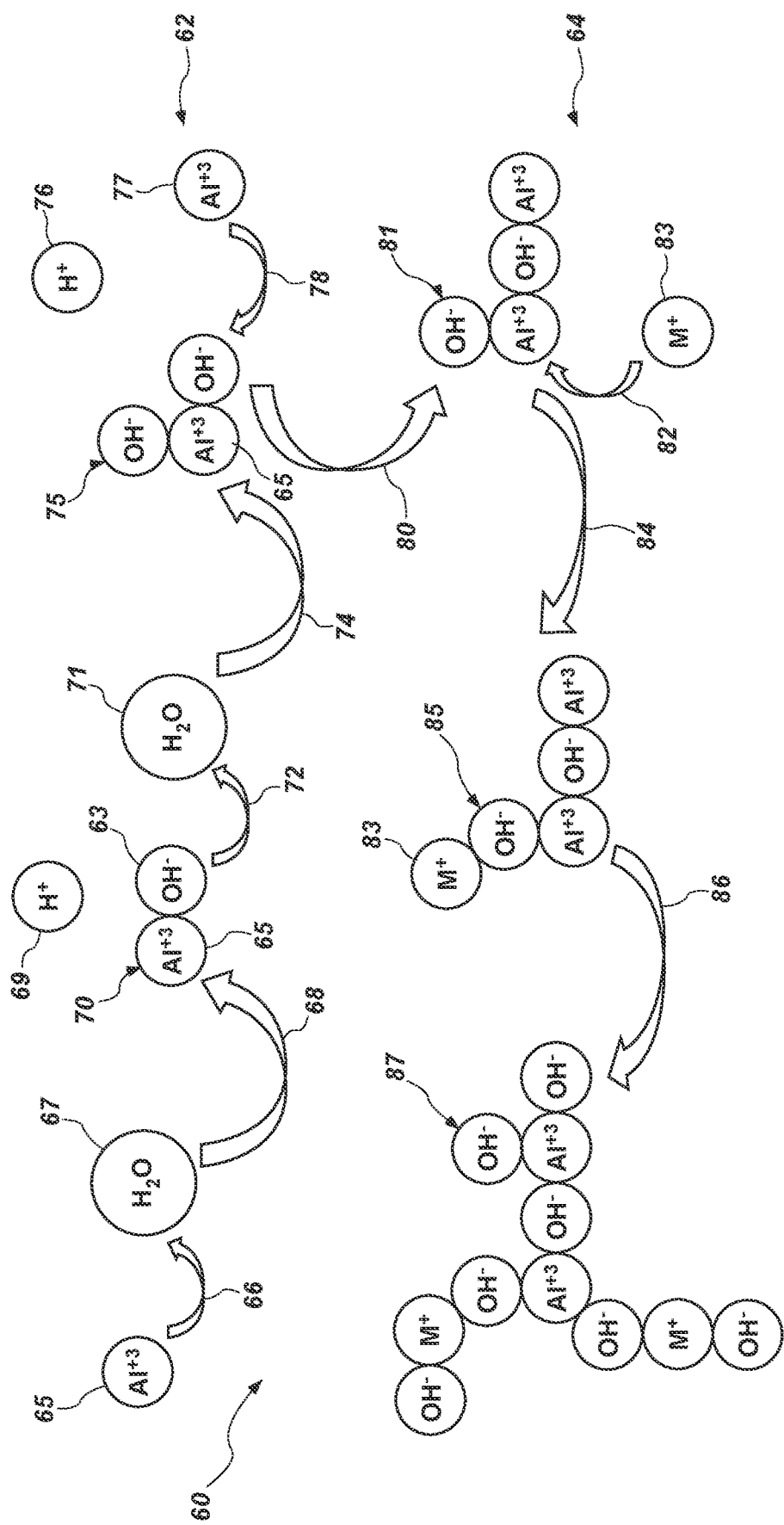
FIG. 2 is a schematic diagram of the chain of reactions occurring in the system of FIG. 1.

Referring to FIG. 2, while continuing to refer generally to FIGS. 1 through 10, a process 60 represents a chemical reaction as a chain 60 of individual, intermediate, chemical reactions. In the illustrated embodiment, the various interactions are statistical in nature. For example, an aluminum ion 65 may leave a sacrificial anode 92 and be resident in an aqueous solution. On the other hand, statistically, periodically, certain of those ions may actually re-embed in the anode 92 or combined with other atoms. Nevertheless, in the main, on a statistically calculable basis, the various illustrated processes will take place at calculable rates.

For example, a continuous ion-generation process 62 constitutes the upper portion of the process 60 of FIG. 2. This generation process 62 occurs within the ion generator 12. The current provided by the current source 50 into the anode 92 introduces ions into the source water 30 ion generator 12.

The precipitation reaction process 64 represents a series of reactions occurring in the precipitation reactor 14. In contradistinction to prior art systems (e.g., EC systems), manipulation of the acidity, or the pH in general, need not be reckoned before the output 34 of the ion generator 12. The acidic nature of certain waters 20 introduced into any reclamation system may tend to maintain, fortify, reduce, inhibit, or otherwise interfere with the processes in the precipitation reactor 14. According to convention, acids may be introduced to lower the pH in prior art systems. Specifically, acid may resist scaling or coating of anodes 92 in the ion generator 12. Prior art systems do not isolate an ion generator 12, but maintain some type of combined reaction system. Thus, in order to reduce coating of an anode 92 with insulating precipitants, acid may be introduced, thus reducing the pH, acidifying the water 30, and scavenging free hydroxide ions 63 within the system 10.

In the illustrated embodiment, a particular metal, such as aluminum, may be introduced as an ion 65 in a solution of water molecules 67. By increasing the availability 66 of the aluminum ion 65 in the water 67, a reaction 68 may be initiated. In the illustrated embodiment, an aluminum ion 65 may combine with a hydroxide ion 63 derived from the water 67. This leaves a free hydrogen ion 69 in solution.

Meanwhile, the aluminum hydroxide ion 70 becoming available 72 to additional water molecules 71 undergoes a reaction 74 in which the aluminum hydroxide ion 75 now contains multiple hydroxide ions with the aluminum ion 65.

The reaction 74 leaves another free hydrogen atom 76. Meanwhile, additional availability 78 of aluminum ions 77 results in a reaction 80 that continues to add hydroxyl groups or ions to a compound 81 or ion 81. However, in the illustrated embodiment, additional ions 77 may react 80 with the aluminum hydroxide 75 to create larger compounds 81 of aluminum and hydroxides.

Ultimately, the availability 82 of other metal ions 83, such as heavy metal ions 83 results in a reaction 84 by the metal ion 83 with the compound 81 or ion 81. The result is the compound 85. At this point, one may question just how strong each individual bond is as the hydroxide ions, aluminum ions, other metal ions, and so forth continue to agglomerate. The settling of such compounds 85 will be driven, to a certain extent, by their density as sediments. However, ongoing reactions 86 continue to make larger compounds 87, held together by weaker and weaker forces.

As a practical matter, the early reaction 68 is largely ionic in nature. Thus, the compound 70 of aluminum hydroxide, although still ionic in nature and unbalanced in charge, is maintained by a comparatively large, ionic force. However, the continued precipitation of the compound 81, and more so the compound 85, results in much lower strength bonds. Ultimately, the long chains of the end compounds 87 may actually be "bonded" more by Van der Waal's forces. Thus, a system 10 in accordance with the invention recognizes the dichotomy in requirements for maximum generation of ions 65 versus maximum precipitation. Countervailing principles control clean ionization into hyper-turbulent flows, versus the limited amount of disruption to which a large compound 87 may be subjected during reaction and growth.

Figure 3:
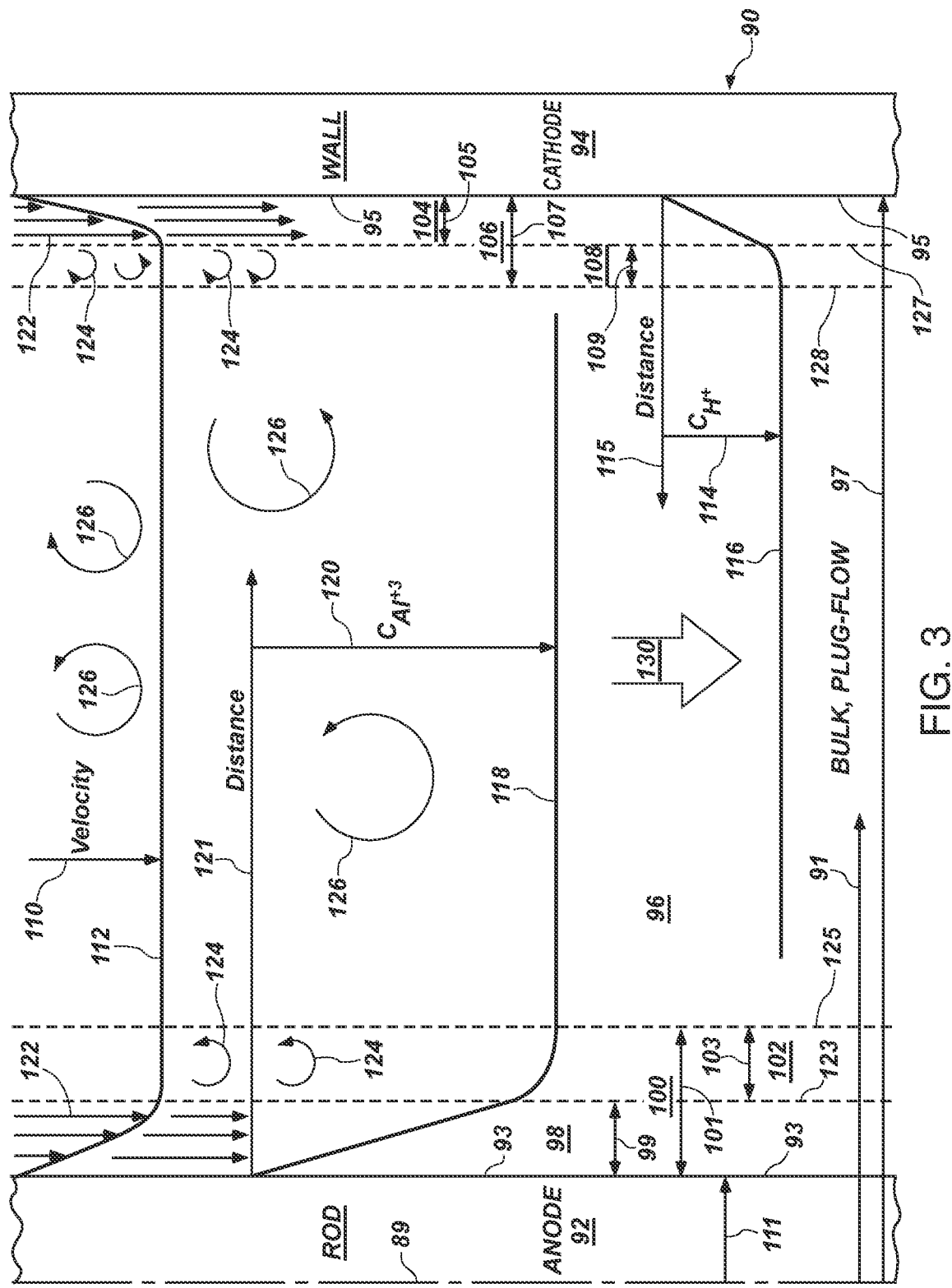
FIG. 3 is a schematic diagram of the flow within the annulus of an ion generator in accordance with the invention, indicating velocity profiles, concentration profiles, and geometric relationships.

Referring to FIG. 3, an individual cell 90 within an ion generator 12 may define the line 89 of radial symmetry. In the illustrated embodiment, a radius 91, in general, may be defined as a distance from the center line 89. In the illustrated embodiment, an anode 92 may be configured as a rod 92 or a cylinder 92 of consistent length, and having a surface 93 that stands electrically opposite to a surface 95 of a cathode 94. The cathode 94 is electrically isolated from the anode 92 (at least as for direct current exchange). Thus, the surface 93 of the anode 92 and the surface 95 of the cathode 94 will pass current through the intervening fluid within the lumen 96 or annulus 96 of the cell 90.

Typically, a radius 97 represents the inside radius 97 of a tube 94 that acts as a cathode 94. Here, a cylindrical geometry, or a right-circular-cylindrical geometry, defines each cell 90. Accordingly, an anode 92, and specifically its outer surface 93 establishes with the inner surface 95 of a cathode 94 at a radius 97 the annular space 96 in which the fluid 30 will flow. Thus, a lumen 96 or annulus 96 is defined by those radii 97, 111 between the surface 93 and the surface 95. They define the lumen 96 or annulus 96 of the system 10, and particularly each cell 90 of the ion generator 12 within the system 10.

Typically, a hydrodynamic boundary layer 98 will be created near a surface 93. According to boundary layer theory, a molecule of a liquid is, nevertheless, stationary at a stationary wall or other interference. The thickness 99 of a hydrodynamic boundary layer 98 will be established by the fluid properties of any fluid flowing through the lumen 96.

A diffusion boundary layer 100 will also be established, but typically extends to a location different from the hydrodynamic boundary layer 104. In the illustrated embodiment, a thickness 107 of the diffusion boundary layer 106 will identify exactly how far chemical diffusion will extend, or how far a concentration gradient of an ion 76 will persist.

Typically, a diffusion boundary layer 106 may have a thickness 107 dictated partially by hydrodynamics, and partially by the chemical concentration of materials. For example, a convection component tends to provide mixing in certain regions nearer the bulk center. By contrast, other regions near solid surfaces 95 tend to be dominated by simple, straightforward diffusion of species. In this case, the aluminum ion 65 is being released at highest concentration at the anode 92.

Typically, one may define a diffusion boundary layer 106 as including the hydrodynamic boundary layer 104 but going further, into a buffer zone 108. The buffer zone 108 may be thought of as a region 108 of transition in which micro eddies or small-scale turbulence provides additional convection between a laminar region 98, and the somewhat circulating, convecting region 102.

The thickness 109 near the cathode 94 need not be the same size as the thickness 103 of the buffer zone 102. Stated another way, each of the zones 108 and 102 is a buffer zone 108, 102, respectively. Yet, each is affected by the diffusion of its species, including metal ions at the anode 92, and hydrogen ions at the cathode 94.

Typically, a velocity 110 of the bulk flow 130 results in a bulk plug flow 130. For example, a velocity 110 across virtually the entire expanse of the lumen 96 results in a very flat profile 112.

The flow of a remediated fluid in a cell 90 will typically be a bulk plug flow 130 through an annulus 96 or lumen 96 defined by a radius 97 and the radius 111 of the right, circular cylinder that is the sacrificial anode 92. Typically, the velocity 110 of the fluid within the lumen 96 generates a velocity profile 112 that spans from the radius 111 at a wall face 93 to the radius 97 at the face 95 on the wall 94 that forms the cathode 94.

Note that these polarities need not change in the apparatus 10 in accordance with the invention. Instead, hyper-turbulence prevents flocculation and resists precipitation. The diffusion boundary layer 100 extends a comparatively short distance 101 from the face 93 of the anode 92. Thus, the boundaries 93, 125, define the diffusion boundary layer 100. Similarly, the boundaries 93, 123 establish the hydrodynamic boundary layer 98 between the face 93 and the boundary 123.

Similarly, at the opposite electrode 94, where the wall 94 of a tube operates as a cathode 94, the hydrodynamic boundary layer 104 may have a distinct thickness 105. Likewise, the diffusion boundary layer 106 may have its own distinct thickness 107. The fact that hydrogen is being reconstituted at the cathode 94, while ions 65 are leaving the anode 92, with ions 113 being generated in the flow 130 will dramatically affect the response, and consequent diffusion layers 100, 106.

In either case, a buffer zone 102, 108 may be thought of as a region 102, 108 of thickness 103, 109, respectively, wherein the hydrodynamic boundary layer 98, 104 is effectively absent, yet the fully involved turbulence may not yet be present. A laminar flow 122 will exist within each of the boundary layers 98, 104. Typically, the concentration 114 of hydrogen ions is reflected in the profile 116 extending a distance 115 from the face 95 of the cathode 94. Meanwhile, the aluminum concentration 120 may be reflected in a profile 118 of concentration within the lumen 96.

Thus, in general, a hydrodynamic profile 112 reflects the variation in velocity 110 within the bulk flow 130 or which becomes bulk plug flow 130 within a lumen 96. Meanwhile, the laminar boundary layers 98, 104 reflect the dramatic variation in velocity radially across a region 98, 104.

The buffer layers 124 proximate either surface 93, 95 each represent a transition in which ions are eventually diffused to have a uniform concentration 120 reflected in the flat profile 118, similar to the flat profile 110 of a fully developed velocity. Similarly, near the cathode 94, within some distance 115 may be a concentration 114 of hydrogen ions 116.

The regions 98, 102, 104, 106 are thus defined by the boundaries 93, 123, 125, 95, 127, 128. Meanwhile, the buffer layers 102, 109 are defined by their adjacent boundaries 123, 125, and 127, 128, respectively.

Typically, the distances 100, 107 are comparatively small, on the order of less than ten percent, and often less than one percent of the overall radius 97 across the lumen 96. Thus, the profiles 112, 116, 118 develop comparatively quickly (e.g., close to solid objects 92, 94).

One reason for the existence of the upper zones 103, 108, is the nature of the distinction between laminar flow 122 and bulk, turbulent, plug flow 130. The regions 102, 108 involve turbulent eddies 124 in transition. Meanwhile, the turbulent eddies 124 represent the transition between the laminar flow 122 within the regions 98, 104. The bulk plug flow 130 of the system 10 reflects the bulk turbulence 126 or large, turbulent circulations with no net motion except axial flow.

In contradistinction to prior art electro coagulation (EC) systems and processes, a system 10 in accordance with the invention relies on the ion generator 12 maintaining plug flow. Plug flow is so absolutely dominated by turbulence throughout that the hydrodynamic boundary layers 98, 104 represent an insignificant fraction of the overall flow 130 in the lumen 96. This causes the flat velocity profile 112 in which the velocity 110 throughout the lumen 96 may be assumed to be the maximum velocity 110, to the exclusion of the laminar flow 122 existing in the hydrodynamic boundary layers 98, 104.

The result of plug flow 130 in the lumen 96 of the cells 90 in the ion generator 12 is that the micro turbulence 124 in the buffer region 108 effectively sweeps clear all ions generated at the surface 93 of the sacrificial anode 92. They are carried through the diffusion boundary layer 100. In fact, the actual diffusion process actually occurs almost exclusively within the laminar hydrodynamic boundary layer 98. In the buffer region 102, the convection of micro turbulence 124 rapidly mixes all constituents, thus bringing the concentration 120 of the sacrificial ions 65 (e.g., aluminum 65, in the illustrated example) up to the level of the bulk profile 118 thereof as illustrated.

This bulk plug flow 130 is maintained pervasively across substantially the entire radius 97 of the annulus 96 or lumen 96. It is also typically maintained throughout the entire length of each cell 90, from inlet to outlet thereof, particularly the length of the anode 92.

This sustained, persistent, pervasive bulk plug flow 130 cannot be achieved in plate types of systems as known in the prior art. Stagnation, back eddies, dead spaces, wide disparity in velocity profile, and the like, are not permitting of this flow. Moreover, geometries preclude such uniformity.

In contradistinction to other prior art attempts at agitation, "turbulence," or other periodic or location-specific turbulence, plug flow turbulence is a direct consequence of maintaining specific conditions at a comparatively very high rate of flow. This means a very high Reynolds number (where Reynolds number is density multiplied by velocity and a significant length, such as a diameter, hydraulic diameter, or the like, all divided by the viscosity of a fluid) at values well into the turbulent region.

Flow near the critical zone of the transition region does not qualify, and will not develop bulk plug flow 130. Thus, whereas the word "turbulence" or "agitation" may be tossed about in prior art, it is clear that such systems as described in prior art references simply do not maintain, cannot maintain, do not suggest, and do not rely on nor benefit from bulk plug flow 130 driven by hyper-turbulence. Typically, in a system 10 in accordance with the invention, Reynolds numbers are maintained above values of five thousand, and typically at values of more than ten thousand. Thus, in a system 10 in accordance with the invention, Reynolds numbers on the order of twenty to thirty thousand, or more are typical. Thus, this is a full order of magnitude larger than the initial value of Reynolds number in the critical zone of the transition region, which starts at about two thousand. At that point, laminar flow begins to be left behind and transition begins. Typically, turbulence is fully developed beyond the critical zone at a Reynolds number of about five thousand. Here, Reynolds numbers of many times that value assure bulk plug flow 130.

The ultimate effect of bulk plug flow 130 in the lumen 96, is a reduction, virtually to the point of eradication, of any effective coating of a cathode 94. Precipitation and inward, radial diffusion of ions 65 from the sacrificial anode 92 by any reactants or precipitants simply has no mechanism. The ionic reactions of metals of any type (sacrificial or heavy metals to be removed) from the incoming water stream 20 is resisted by the flood of ion 65 and paucity of electrons.

Hence, the ion generator 12 is maintained under hydrodynamic, electrical, and chemical conditions to assure that it is substantially exclusively an ion generator 12. This occurs to the exclusion of precipitation reactions. They are reserved for the precipitation reactor 14. Any pretreatment requirements, acidification, or other prophylactics to forestall, slow, or retard precipitation reactions do not occur here as in other prior art systems that do not maintain flows within these Reynolds number ranges.

The order of magnitude of the thickness 99 of the hydrodynamic boundary layer 98 may be of the order of magnitude of the buffer layer 102. Thus, the incursion of precipitants is effectively prohibited. The laminar flow 122 is still vigorous with high shear stress, but is thinned down by the bulk plug flow 130. Thus, the opportunity for any statistically significant diffusion in a reverse direction by precipitants toward the face 93 of the anode 92 has been virtually eradicated. Accordingly, coating out of precipitants on the sacrificial anode 92, is effectively precluded at any significant quantity or with any significant persistence.

Thus, scrubbing, although effectively present, by the vigorous flow 130 in the lumen 96, need not even be relied upon. Rather, the reverse diffusion of chemical species toward the anode 92, as it donates its entire surface 93 in ions, simply does not brook any coating out of precipitants on electrodes 92, 94. Moreover, the high power densities, the net current driven (electrons received) by the current source 50 into the anode 92, weights the reaction, or the ionic formation process in favor of driving aluminum ions 65 from the anode 92 into the bulk plug flow 130.

Coating (which depends on quiescence, or laggard, laminar flows and stagnation) simply is not permitted at any measurable or calculable rate. As a practical matter the mass transport and electrochemical balance in the region 98 is so dominating and so matched to the ability of the bulk plug flow 130 to carry away the ions, that no species of heavy metals in the bulk flow 130 can migrate to the surface 93 at any appreciable rate.

Ions near the electrodes 92 are immediately treated as the ions leaving the anode 92, themselves losing, not gaining, electrons. Thus, there is effectively no point at which a precipitated heavy metal ion can land. Hence, in experiments operated by Applicants, the pitting common to electrodes in conventional electro coagulation systems was completely absent. A precisely, electrodynamically machined, outer surface 93 persisted at all radii 111 of the anode 92, from new installation, to complete decimation. Thus, a system 10 in accordance with the invention provides electrostatic machining of the sacrificial anode 92, as precisely and effectively as electrodynamically machining (EDM) in the manufacturing industry.

An apparatus and method in accordance with the invention rely on the bulk plug flow 130 as a flow regime that is so hyper-turbulent that it virtually precludes any precipitation reaction within the ion generator 12. For example, (e.g., EC) prior art systems typically rely on a tank of some configuration in which generation of ions from a sacrificial anode occurs in the same continuous and contiguous medium as the precipitation and coagulation reactions. Large molecules or ions are made up of multiple metal ions and hydroxide ions. Isolation of the ion generation, as created in the ion generator 12, from the precipitation reactor 14 and its precipitation reaction, is impossible in typical prior art approaches.

In an apparatus and method in accordance with the invention, the incoming flow 30 received by the ion generator 12 does not include any manipulation of the pH (basic or acidic nature) of the influent water 20. Rather than manipulate the pH to make the flow 30 more acid, an ion generator 12 in accordance with the invention hydrodynamically isolates heavy metal ions, that are to be removed from the flow 130, from the sacrificial anode 92.

For example, the hydrodynamic boundary layer 98 is so vigorous in its hydrodynamic intensity, that migration of ions of heavy metals from the flow 130 to the anode 92 is effectively eliminated. First, the anode 92 is contributing sacrificial ions 65 at the maximum possible rate available based on the current source 50. The approach of some random heavy metal ions may be occasioned due to the fact that the flow 30 does contain those ions. Accordingly, any metal ions 83 in the liquid in the hydrodynamic boundary layer 98 will be treated by the anode 92 as if they were the same as the ions 65. The anode 92 will simply receive an electron from that metal, and return it into the flow 130 as a metal ion.

Moreover, any compound in which a heavy metal may be found in the flow 130 might approach the anode 92, but would immediately be subjected to the electrostatic potential available from the anode 92, ionizing the compound, and dismembering the ions or atoms from one another. Thus, the electrostatic potential near the anode 92 tends to drive metal ions into solution, not precipitate them out. The fact that the diffusion boundary layer 100 and the hydrodynamic boundary layer 98 are so comparatively thin compared to the overall radius 97 between the anode 92 and the cathode 94, militates against any precipitation and coagulation.

The hyper-turbulence occasioned by the extremely high (comparatively; on the order of ten to thirty thousand, typically) Reynolds number within the flow 130 presents so much shear in the laminar flow 122, as to overcome any Van der Waal's forces that might exist due to any of the reactions 64. That is, the agglomeration of ions by forces weaker than ionic attractions are overcome by the mechanical shear forces existing between stream lines in the laminar flow 122 of the hydrodynamic boundary layer 98. Thus, precipitation and flocculation are effectively precluded mechanically and electrically within the ion generator 12.

The cross-sectional area is substantially constant along the entire length of each cell 90. There is no appreciable change in velocity or direction along the length thereof. This results in a uniformly severe condition of shear in the hydrodynamic boundary layer 98. Thus, each cell 90 provides a hydrodynamically isolated ion generator 12 completely separated from the precipitation reactor 14 and its processes. Mechanically, the precipitation reactor 14 is a different physical containment structure. However, the very processes of the reactions 64 are precluded by the vigor of the boundary layers 98, 100, the high rate of viscous shear therein, and the inability of any agglomeration of precipitants to mechanically survive. Thus, the inertial forces as represented in the Reynolds number completely dominate, and will reverse if present, any agglomeration due to Van der Waal's forces or other similarly weak attraction.

Figure 4:
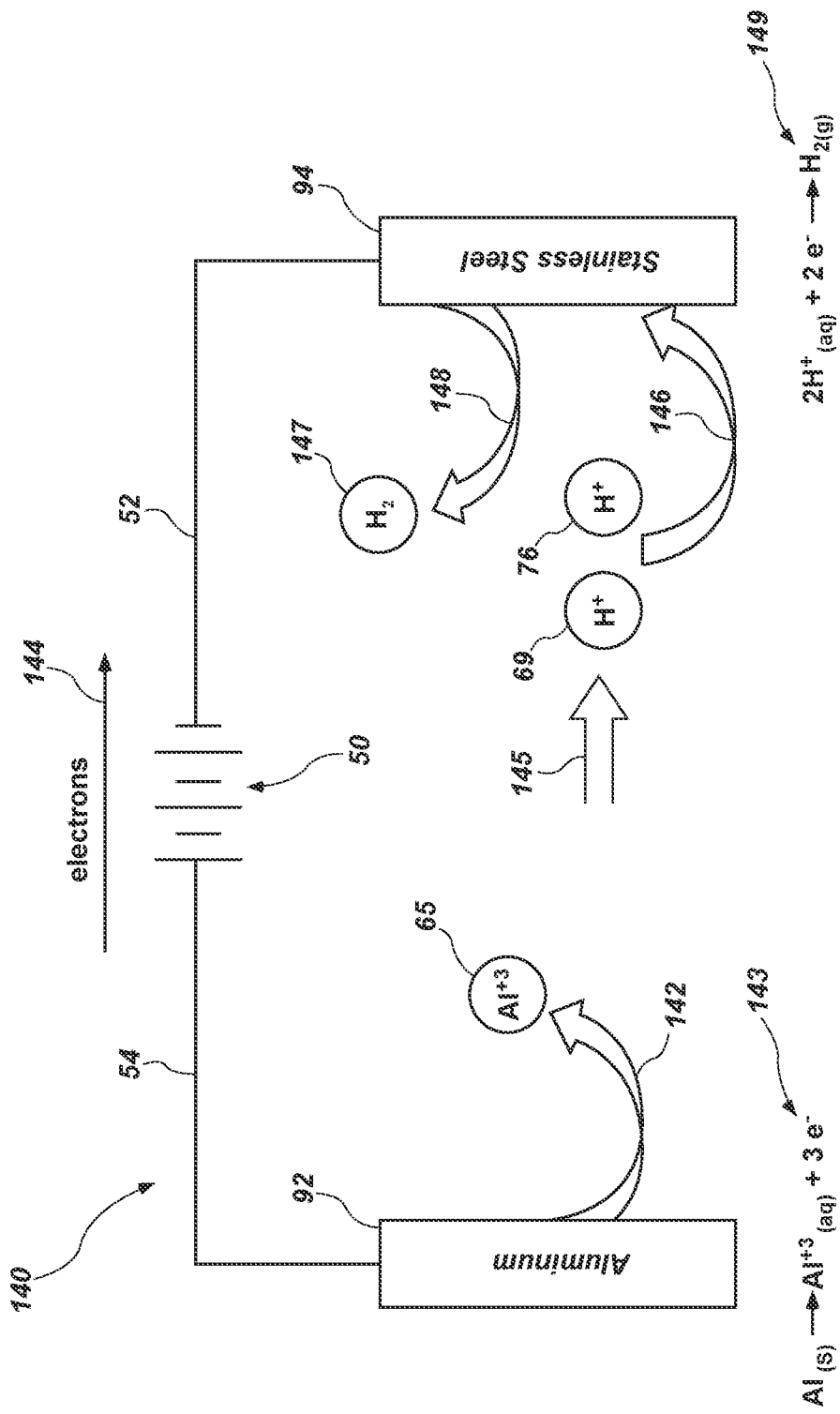
FIG. 4 is a schematic diagram of the ionic reactions at the electrodes, anode and cathode, of an ion generator in accordance with the invention.

Referring to FIG. 4, reactions 140 are illustrated schematically. Individual reactions 140, or individual instances of the reactions 140 include a release 142 of a metal ion 65, shown here as an aluminum ion 65 occur at an anode 92. Electrons 144 driven by a power source 50 through the lines 52, 54 facilitate the reaction 142, converting elemental aluminum to aluminum ions 65.

Meanwhile, a migration 146 may be thought of as a reaction 146 inasmuch as the hydrogen ions 69, 76 from the flow or fluid carrier in which ions 65, 69, 76 are present may involve several reactions intermediate the anode 92 and the cathode 94. Those reactions result in a certain degree of electrophoresis. That is, ions 65, 69, 76, will tend to drift or diffuse, under electrostatic force, through the carrier liquid (e.g., water). Also, reactions may occur at one location, facilitating release of electrons, facilitating other reactions elsewhere. Hydrogen ions 69, 76 may or may not originate near the anode 92 or the cathode 94. On the other hand, the ultimate reaction that provides the ions 69, 76 may simply be the last in a long chain, dependent upon the rapid transfer of electrons between various species and solution.

The result is a donation 146 of the hydrogen ions 69, 76 at the cathode 94 where electrons are available for facilitating a reaction 148 generating hydrogen molecules 147. The equation 143 governs the generation 142 or reaction 142 creating aluminum ions 65. Meanwhile, the reaction 149 governs the conversion of hydrogen ions 69, 76 with the electrons to form hydrogen gas 147 or hydrogen molecules 147 at the cathode 94. This completes the reaction 148 of the equation 149.

The electrons 144 are released to an anode 92. It accepts electrons from the elemental aluminum, causing generation of the aluminum ion 65. Meanwhile, the lines 52, 54 carry those electrons to the cathode 94, where they may readily donated to hydrogen ions 69, 76, resulting in neutralization of their charge, and their stabilization in a covalent bond in the hydrogen molecule 147.

Figure 5:
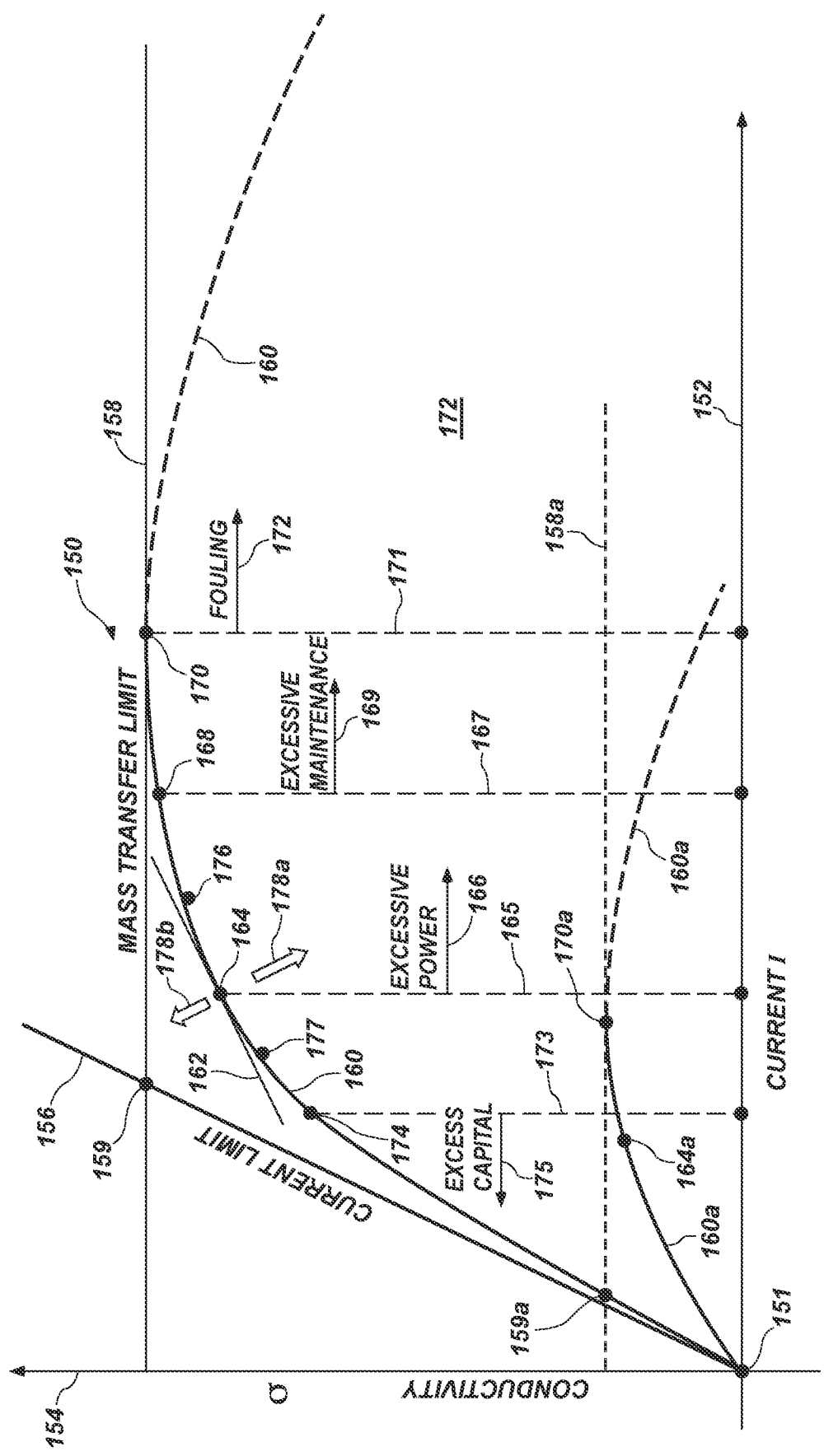
FIG. 5 is a graph indicating the curves of current limit, mass transfer limit, and the electrical conductivity performance curve of a system and method in accordance with the invention.

Referring to FIG. 5, the mass transfer (transport) limit 158 depends on such dimensionless parameters (well defined in the fluid mechanics and the heat and mass transport technology) as the Nusselt number, the Prandtl number, and the Reynolds number as reported in the heat and mass transport literature. Properties of consequence are densities, fluid viscosities, heat transfer areas, thermal conductivities, specific heat capacities of materials, and so forth. The correlations between Reynolds number, Prandtl number, Nusselt number, and other similar dimensionless parameters that may be applicable to the establishing of mass transfer limit 158 on the theoretical basis are not repeated here, but are available in any suitable text on heat and mass transport.

The graph 150 is actually one single graph 150 from an entire family of graphs 150. For example, this graph 150 illustrates the variation of electrical conductivity 154 as a function of current 152 introduced into the ion generator 12, or a cell 90 thereof.

However, the entire family corresponds to different settings for additional parameters taken as constants, unvarying throughout the domain of this instant graph 150. Some of those other parameters will vary, thus moving into a different plane of operation as represented by the axes 152, 154. Parameters may include, for example, the constitution of waste water 20 being treated. Another such parameter that is fixed for the purposes of the graph 150 is the actual volumetric flow rate Q (Q dot). Others are the material properties and geometries associated with the Reynolds number, Prandtl number, and Nusselt number, and so forth. For example, density, viscosity, significant length, thermal conductivity, specific heat, and the like are considered non-variant for the chart 150. Variation of one or more of those parameters may generate a different chart 150, and specifically a different curve 160.

The experiments conducted by Applicant demonstrate the existence of the curve 160, and the qualitative relationship illustrated in the chart 150. In the illustrated embodiment, the curve 160 has a slope 162 or tangent 162 at any and every point. The slope 162 represents the rate of change of the curve 160 at the point of tangency. Several tangent points 160, 164, 168, 170 are illustrated. Each has significance.

For example, the point 164 represents an optimum 164, or an operational point 164 that balances several competing considerations. Meanwhile, the boundary line 165 defined by the optimum 164 establishes a region 166 of all electrical current levels greater than that associated with the point 164. This region 166 represents a region in which excessive power usage from the current source 50 will be likely if additional power is drawn.

Accordingly, in currently constituted embodiments used in experimentation, a length of a cell, and thus the length of an anode 92 and the effective length of an ion generator 12 have been defined. The annulus 96 between the anode 92 and the cathode 94 or the tube 94 surrounding the anode 92 is defined. Meanwhile, a mass flow rate or volumetric flow rate of fluid based on the Reynolds number has been established at a bulk plug flow 130 for the regime.

The fluid properties were identified in accordance with the prevailing temperatures and so forth, in order to establish all pertinent fluid parameters. Under these conditions, the concentration of the aluminum ion may be directly reflected in the electrical conductivity or sigma (G) as identified on the y axis 154 of the graph 150.

Meanwhile, the concentration of the aluminum ion 65 or the donated ion 65 from the anode 92 is equal to current divided by a constant representing certain material properties characteristic of the material of the anode 92. It is also divided by the volumetric mass flow rate. Of course, the units must be consistent in order to maintain dimensional consistency throughout the equation. The result of that concentration is that the electrical conductivity 154 is also proportional to that concentration. In fact, the change in concentration between the maximum concentration in the system 10, and the maximum electrical conductivity 154 at any point reflects ions removed from solution. Electrical conductivity is proportional to a constant times the concentration of the ion in question, aluminum in this example. Thus, the rise in electrical conductivity is proportional to the rise in concentration of aluminum ion, multiplied by that constant.

Stated another way, or in consequence thereof, the net electrical conductivity of a fluid having a constitution of ions therein is a summation of the individual electrical conductivities, where each electrical conductivity is proportional to a constant peculiar to the material, multiplied by the concentration of that material in the flow. In order to calibrate back to reality from this theoretical calculation, a parameter zeta ($\zeta$). Values of zeta are typically in the range of from about 0.4 to about 0.7. The value of zeta is proportional to concentration multiplied by a constant of proportionality (18.34 for aluminum) multiplied by the volumetric flow rate of water divided by current and divided by the molecular weight of the species whose conductivity and concentration are in question.

The foregoing relationship, when written in mathematical equation form, is the equation by which one may determine the initial set point 164 or optimum 164 at which to operate the system 10.

The operational point 164 represents an optimum according to the representation that the precipitation efficiency, called zeta, is equal to the concentration of the ion in question multiplied by a constant of proportionality (18.34 for aluminum) and multiplied by the volumetric flow rate of the incoming water 20 divided by the current and the molecular weight of the ion in question. Thus, this zeta ($\zeta$) principally defines the electrical conductivity 154 in the chart 150.

Operation above the point 168 is within a region 169 bounded by the boundary 167 above which excessive maintenance will be required. Excessive maintenance will be required because the system 10 will periodically pass into the fouling region 172 identified by the point 170, a zero value of the slope 162, the first derivative 162 of the curve 160.

The boundary 171 defines the region 172 in which fouling will absolutely occur. Fouling occurs because the mass transfer limit 158 has been met, and the current is continuing to increase, thus creating ion species that will precipitate and foul the anode 92. Meanwhile, to operate above the point 168, is to add current 152 within the excessive maintenance region 169. Operation is above the border 167 or boundary 167. Variations in temperature, fluid properties, constitution of the fluid 20, and the like may result, and typically will therefore result, in periodic excursions into the fouling region 172 from the point 168.

Thus, a set point 164 provides a certain amount of protection against such excursions into the excessive maintenance region 169, the fouling region 172, or both. Meanwhile, the marginal increase in electrical conductivity 154, and thus ions dissolve in solution, above the point 164 has a diminishing return. Note the increase in current 152 between the points 164 and 168. Note the difference in electrical conductivity 154 between the points 164 and 168. The marginal increase in electrical conductivity 154 as a result of increases in current 152 is simply too marginal to be worth the risk of excessive maintenance or fouling.

Likewise, however, the point 174 is operating at a lower current 152. This results in a lower electrical conductivity 154 reflecting fewer ions in solution. The region 175 defined by the boundary 173 coincident with the point 174 represents excess capital cost. For example, too much capacity is being required as infrastructure, in the way of the ion generator 12 specifically, and probably as well in the precipitation reactor 14. This excessive infrastructure is due to an unwillingness to push the current 152 above the value represented by the point 174.

Meanwhile, the marginal increase in electrical conductivity 154 by increasing the current above the value corresponding to the point 174 is significant. This represents little risk of passing into the fouling region 172, and thus the region 175 is an excess capital region 175. Too much infrastructure is created without being effectively used. Without an undue amount of power expense, additional current may be delivered from the current source 50 into each cell to achieve the increased ion concentrations, reflected by the electrical conductivity 154, without undue increases in current 152.

The excessive power region 166 established by the boundary 165 reflects the fact that the point 164 achieves an optimal value of electrical conductivity 154 (ion concentration in solution) at a modest or reasonable input of current 152. Note that the slope 162 begins to drop off substantially at values of current 152 above the point 164. For example, above the point 168, almost no perceptible benefit in electrical conductivity 154 is achieved, while a substantial increase in current 152 is required. Thus, the marginal value of power increases between the points 168 and 170 clearly militates against operating anywhere within that range. Meanwhile, the risks discussed hereinabove are not worth operating above the point 168. On the other hand, the excessive power region 166 suggests that more capacity can be built more cheaply than excessive power can be purchased.

This optimization may be done by comparing the economic value in distributed value of money over time, present value of expenditure, or simply the advertised cost per barrel of water treated. Thus, when the cost-per-barrel of increased power in the excessive power region 166 warrants, then the additional capital expenditure for adding cells may be warranted.

In one embodiment, cells may be taken offline while in operation. Accordingly, automatically switching may simply provide for optimizing the operation at the point 164 or thereabouts, within some tolerance region. This may be done in order to maximize the value of power purchased for driving the current source 50, while still obtaining maximum dissolved ions as represented by the electrical conductivity 154. Thus, one may optimize economically to find the point 164 at which the economics of maintenance, power costs, and capital investment are best balanced according to financial considerations or economics.

In certain embodiments, a sensitivity of the curve 160 to variations in flow rate, current, operational efficiency, and the like may result in the curve 160 shifting. For example, the curve 160 may move in a direction 178a if the mass transfer limit 158 or mass transport limit 158 is reduced. Similarly, increases in the mass transfer limit 158 or mass transport limit 158 may result in the curve 160 moving higher at the point 170 where contact is made.

Considered another way, a current limit 156 may be controlled by physical phenomena such as electrical conductivity, area, current density, and the like. Ultimately, the current limit 156 may depend on a variety of physical parameters and physical material properties. Thus, a point of intersection 159 at which the current limit 156 intersects the mass transport limit 158 may actually move upward or downward. Accordingly, the curve 160 may shift in a direction 178a or a direction of 178b as a result of the change of the mass transfer limit 158.

However, the directions 178a, 178b also represent the process of optimization. For example, the current limit 156 is a theoretical limitation on the ability to drive current 152 through the anode 92 and into the flow 130. Thus the discrepancy measured in the direction of the x axis 152 or the current axis 152 between the current limit 156 and the curve 160 represents an inefficiency. That inefficiency is measurable as the amount of current 152 that is effectively lost to ionizing the metal ions 65. It is consumed in the thermodynamic losses incident to all actual physical processes.

For example, in accordance with the second law of thermodynamics, a theoretical limitation on how a process may occur is a matter of certain analyses. Nevertheless, the realities of time, space, material properties, and various losses in processes result in some efficiency less than the theoretical maximum. Thus, the current limit 156 may be simply calculated. However, it will typically never be achieved in an actual physical system. Rather, the curve 160 is qualitatively the actual relationship between conductivity 154 (which represents ions in solution) and the current 152 actually applied to an anode 92.

In optimizing performance, it is desired to move the curve 160 in a direction 178b, toward the current limit 156, and the mass transport limit 158. Any failure of the curve 160 to match the curves 156, 158 represents inefficiency. That inefficiency represents the addition of current between the operational point 164 and the current limit 156. The ionization or electrical conductivity 154 lost is represented by the distance between the point 164 of operation and the mass transfer limit 158.

Optimization is desirable and possible in a system 10 in accordance with the invention. The processes incident to EC documented in the prior art may be represented by a depressed or reduced mass transport limit 158a considerably below the original mass transfer limit 158 of a system 10. Accordingly, the resulting curve 160a in prior art systems represents the electrical conductivity in their quiescent fluids.

For example, prior art systems combine in a single reactor both the processes of ionization and precipitation. In fact, many combine the processes in the exact same physical space between electrode plates. As a direct result, the curve 160a is limited not only by the current limit 156, but also by the reduced mass transfer limit 158a. The difference between the mass transport limit 158a and the mass transport limit 158 is a direct consequence of the quiescence of prior art systems, compared to the vigorous, hyper-turbulent, high-Reynolds-number flow in the lumen 96 of a cell 90 in accordance with the invention.

Consequences falling out of that quiescence include a point 170a at which fouling begins if current 152 is increased. Thus, the decay in the curve 160a begins at the point 170a at which the mass transport limit 158a limits any further ability to benefit from an increase in the available current 152 supplied. The curve 160a is shifted to a much lower curve and has a zero value of slope at a point 170a representing a much lower current 152. It also has a higher fraction of that current devoted to losses as represented by the distance between the point 170a and the current limit 156 along the mass transport limit 158a.

One may note that the optimization of a curve 160a is circumscribed by the same current limit 156, but at a much lower value of current 152. Likewise, the curve 160a is limited by the mass transport limit 158a and is much reduced because of the lack of the hyper-turbulent convection of plug flow in the cell 90 of a system 10 available with the invention. Thus, the point of intersection 159a at which the current limit 156 intersects the mass transport limit 158a represents a theoretical optimum or maximum that the curve 160a may fit.

However, the same thermodynamic limitations exist. Moreover, additional electrical losses occur due to the inefficiencies of ion generation. This is a direct result of the quiescence and the coexistence of ionization, precipitation, and flocculation in the same physical space. They act as retardants to both the process of ionization and the process of precipitation.

Figure 6:
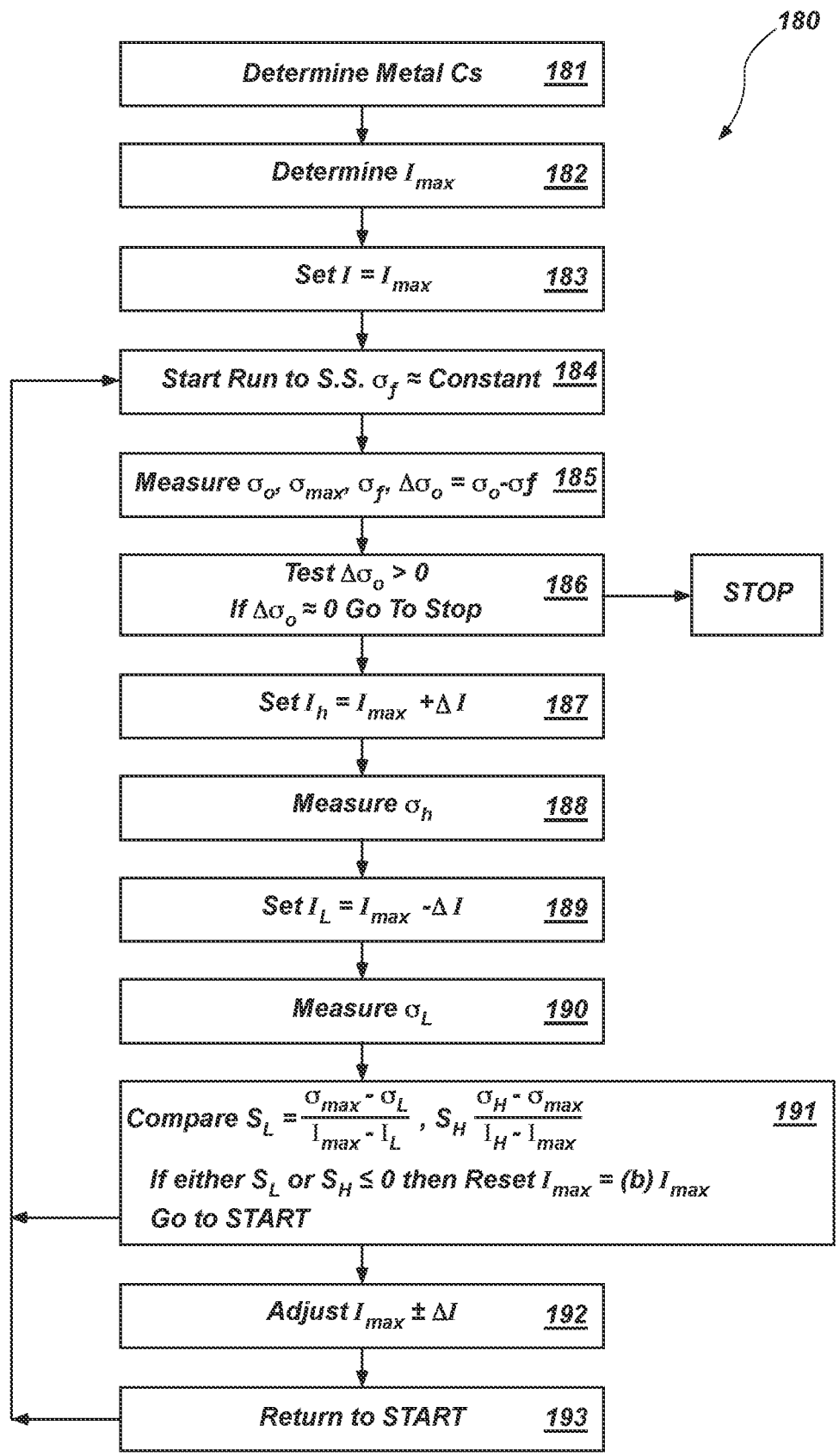
FIG. 6 is a schematic block diagram of a process in accordance with the invention for setting up, evaluating, and controlling the performance of a system along the performance curve of FIG. 5.

Referring to FIG. 6, a process 180 for controlling the operational point 164 is illustrated. The process 180 involves not only an initial selection of an operating point 164, but also a sensitivity analysis. A system 10 may perturb the conditions about the point 164, in order to determine whether it may be further improved or optimized.

Referring to FIG. 6, as a very real and practical matter, conditions for waste water streams 20 being remediated are not in a steady state condition. Waste water constitution (the catalog or list of constituent dissolve solids, salts, heavy metals, and so forth) may vary day to day and hour to hour as waste water is delivered by tank, truck, train, pipeline, or the like to a system 10 in accordance with the invention.

Therefore, to maintain operation at currents 152 well below the excess maintenance boundary 167 represented by the point 168, it is imperative that a control mechanism be developed. In one embodiment of an apparatus and method in accordance with invention, a process 180 may be used for continuing monitoring and feedback control of the system 10 in accordance with the invention.

Initially, determining 181 a metal concentration may involve selection of a particular metal. Calculation of the total concentration will be required in order to treat the particular constitution in a waste water stream 20.

For example, the concentration of the candidate sacrificial anode metal required is equal to a level of current multiplied by the molecular weight of a constituent to be removed, divided by the constant relating to the candidate metal (18.34 in the case of aluminum) also divided by the volumetric flow rate through the system 10. This is all multiplied by the precipitation efficiency, zeta.

The system 10 may determine 181 the concentration expected in solution of the flow 130 for each and every metal type to be removed from the flow 130 as described hereinabove. The summation of the requirements for each metal to be scavenged or removed will result in the net concentration required of the sacrificial metal ions 65 to be constituted in the anode 92.

Next, determining 182 a maximum current 152, or the current corresponding to the operating point 164, involves additional equations expressing the relationship between the incoming waste water stream 20 and its constitution, from the water analysis report. Also, the current is a function of experimental data indicating operation of theoretical equations as discussed herein, the concentration of the sacrificial metal, and so forth.

One may note that the precipitation efficiency, zeta, is a rating factor or reality factor adjusting theoretical numbers. Thus, such empirical information will reveal the value of zeta. In initial analyses, a value of zeta within the range from about 0.4 to about 0.7 may be selected, and parametric variations may be run to establish the range of the variables effecting the current 152 at the set point or operational point 164.

Next, a system may be put in operation and the current 152 may be set at a value corresponding to the point 164 as determined from the step 182. Setting 183 the current 152 may be followed by starting 184 the system 10 and running it to a steady state condition. The electrical conductivity 154 will be a constant without substantial variation for a particular flow rate of a constitution involved with the water 20 being remediated. Steady state simply means that the system has come to an operating point 164 that is not varying substantially over time. As a practical matter, the conductivity at the outlet 38 of the precipitation reactor 14 should likewise be a constant. In other words, the system is operating at a steady state.

Measuring 185 the electrical conductivity 154, at the inlet flow 30 into the ion generator 12, as well as the maximum electrical conductivity 154 at the outlet line 34 of the ion generator 12 will establish a point 164. The pH adjuster 31 and flocculent polymer source 32 should not affect the electrical conductivity 154.

Similarly, the electrical conductivity 154 at the outlet 38 of the precipitation reactor 14 can also be measured. An effective electrical conductivity 154 change or delta (δ) will be the difference between the electrical conductivity 154 in the outlet 38 from the precipitation reactor 14 less the initial electrical conductivity 154 at the inlet line 30 to the ion generator 12.

Testing 186 determines whether the delta or change in electrical conductivity 154 is greater than zero. If so, then the operational point 164 is to the left of the point 170 on the chart 150 of FIG. 5. If, for any reason, the change in electrical conductivity 154 is near zero or negative, the system 10 should be shut down immediately and evaluated against the water analysis report and the theoretical operating point 164.

The reason for this is that a negative slope 162 on the curve 160 indicates that operation has drifted into the fouling region 172. This is inappropriate, intolerable, and contrary to the design concept for a system 10 in accordance with the invention. Alternatively, a value of about zero, without a negative value may indicate that no change in conductivity is occurring. Thus, no heavy metals are present to which to bond, and no heavy metals are present to alter conductivity. The presence of the sacrificial metal ions 65 is not effective to remove non-present target metals. This indicates as a general proposition a change in the constitution of the influent 20.

A process 180 may include setting 187 a current at a high or incremented value. This corresponds to moving current to the right from the point 164 along the curve 160. Accordingly, some incremental increase in current 152 may be added to the current at the point 164, with a consequent movement of the operational point 164 to the right along the curve 160. This may be chosen as some fraction, such as a small percentage or small fraction on the order of five, ten, or fifteen percent.

Typically, one desires to not perturb the current 152 beyond the point 164 to approach a point 168. Definitely anathema is to pass the point 170. This will not destroy the system, but will cause immediate incipience of fouling in the system. Fouling is difficult to recover from, and an apparatus and method in accordance with the invention should effectively eradicate fouling. Thus, there is really no percentage in operating under fouling conditions.

Next, measuring 188 the electrical conductivity 154 at the outlet 38 reflects the electrical conductivity 154 on the curve 160. This indicates how far the point 164 has moved upward and to the right along the curve 160. Similarly, setting 189 the current 152 at a value departing from the initial position of the point 164, downward to the left, represents a negative increment or a decrement in the current 152. This may similarly be done as a proportion or fraction of the current 152 at the point 164.

Measuring 190 the electrical conductivity 154 at this new value of the point 164 will result in a new slope 162, as well as a new value of conductivity 154. Stated another way, both the value of conductivity 154, and the rate of change of conductivity about the point 164, have now been determined. Accordingly, an analysis 191 involves computing and comparing the slope to the left of the initial point 164, to the slope to the right. This will indicate where on the curve 160 the point 164 is relative to such pivotal points as the point 174, the point 168, the point 170, and so forth.

Here, the change in electrical conductivity 154 may represent the perturbations about the point 164. The points 176 corresponds to an increase in current 152, and the point 171 corresponds to a decrease in current 152. Thus, if the difference in electrical conductivity 154 between the points 176 and 164 divided by or per the amount of change in the current 152 therebetween, becomes negative, then operation is transferred into the fouling region 172.

Nevertheless, a value of difference in electrical conductivity 154 per difference in current 152 may be represented as a fraction for the point 176, and a different fraction for the point 177. If either of the slopes 162 corresponding to either of the points 177, 176 is negative, then the system 10 is in the fouling region 172. It should be shut off, and the process 180 should be begun with new information and evaluation of the system 10. Meanwhile, the slopes 162 corresponding to the points 176 and 177 should actually be decreasing in value with increased current 152. Thus, the curve 160 should be changing in slope, decreasing in slope, flattening out, and approaching the point 170.

In one embodiment, a fraction of the slope 162 of the current limit 156 may be used. For example, if a slope 162 has decreased to less than about one third, then the trade off of electrical conductivity 154 for current 152 is particularly poor. Stated another way, the marginal value of an increase in current 152 is a very limited increase in electrical conductivity 154, and thus in the presence of additional ions 65. After a few tests, and a sensitivity analysis for different ranges of constituents in the incoming water 20, a specific fraction may be selected. The slope 162 should never be allowed to decline below that fraction of the initial current limit 156. This depends very much on the sensitivity of the system 10 to the changes in temperature, fluid properties, constitution of the incoming influent stream 20, and so forth.

Adjusting 192 current 152 for the point 164 may be thought of as a function of the ratio of the slopes 162 corresponding to the points 176 and 177. Likewise, the net change in the functional value, that is, the actual electrical conductivity 154, is also an independent variable on which the adjusted current 152 will depend. Typically, adjustment 192 may be based on experiment, theory, or curve fits according to "numerical methods." That term of art is well understood and defined in the arts of mathematics and engineering modeling.

In one embodiment, a threshold minimum slope 162 may be established, even somewhat arbitrarily. For example, one third of the slope 162 of the current limit line 156 should be a reasonable proportion, based on the principle of cosines. That is, most of the benefit to be achieved along the curve 160 is achieved well before the point 170 of a zero value of slope 162.

A return 193 to continuing operation will typically involve a return 193 to the step 184 of running the system 10 in a steady state. Periodic repetition of the steps 184 through 192 will maintain the system 10 sensitive to and responsive to changes in environment, constitution of the incoming water stream 20, and so forth. Meanwhile, the intrinsic material properties or fluid properties such as viscosity, density, and so forth as they may be affected by temperature and constitution may also be factored into the sensitivity analysis of the method 180 or process 180.

Figure 7:
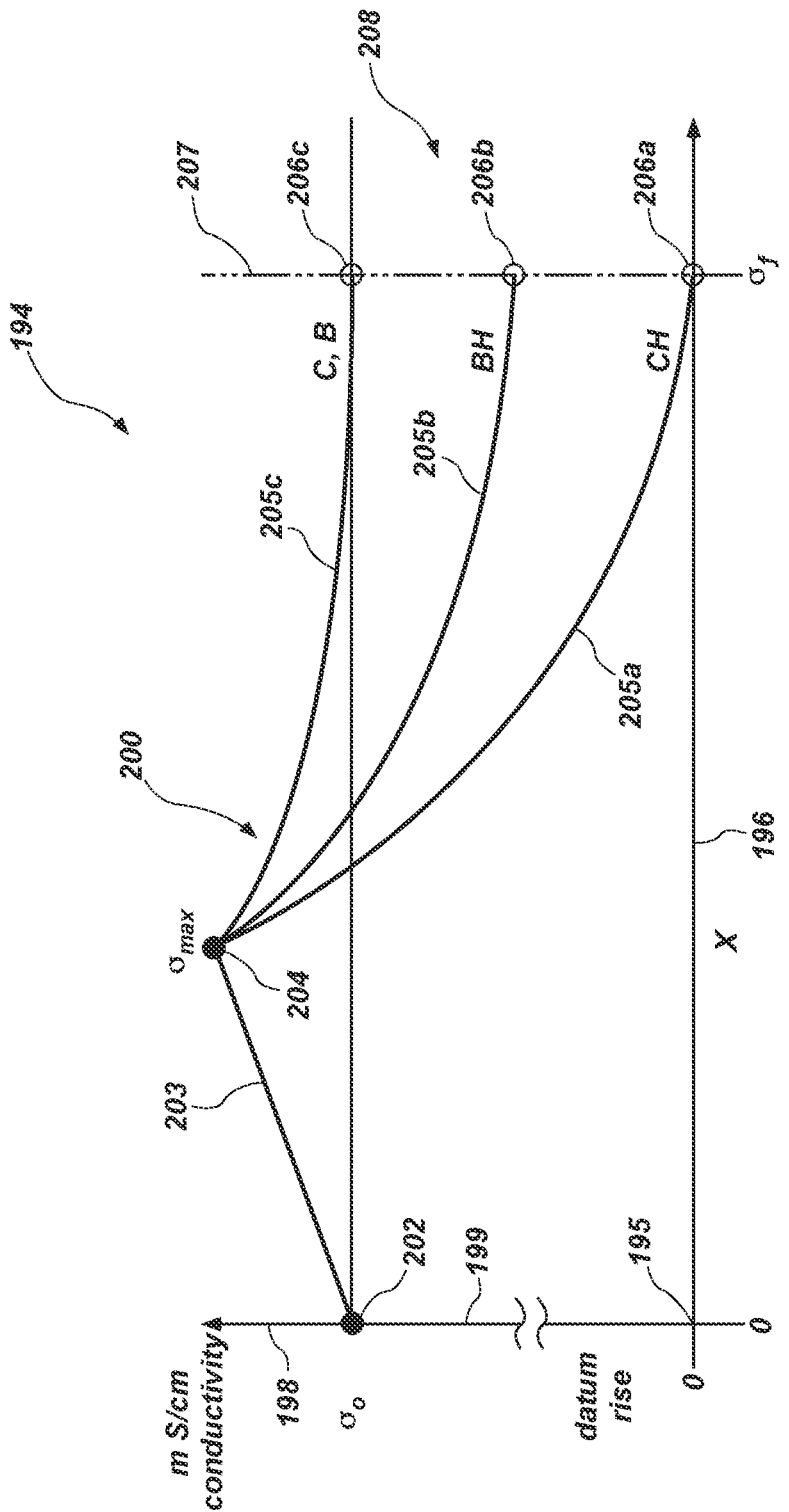
FIG. 7 is a graph showing the electrical conductivity, reflecting ionic concentrations within a waste water treatment stream, as a function of distance through the system, including passage through the ion generator and precipitation reactor of FIG. 1.

Referring to FIG. 7, while continuing to refer generally to FIGS. 1 through 10, a chart 194 or graph 194 illustrates an origin 195 at which a distance axis 196 identified as x intersects a conductivity axis 198 representing electrical conductivity 154. Electrical conductivity may be measured in micro Siemens per centimeter. Similarly, conductivity 154 may be described in terms of inverse Ohms per unit distance. In the graph 194, the data rise 199 represents an offset 199 between the origin 195 and an initial value of electrical conductivity 154.

The point 202 represents a starting point 202 or an initial value 202 of electrical conductivity 198. Within the ion generator 12, the curve 203, which is linear, typically, progresses with an increase in distance 196 along the length of a cell 90 of the ion generator 12 to a maximum value 204.

In the illustrated embodiment, the electrical conductivity at the point 204 is a function of the mass flow rate, the current, the type of material at the anode, as well as the constitution (e.g., the overall suite of constituents within the incoming water 20), and so forth.

In fact, the data rise 199 reflects the electrical conductivity 154 of an initial stream 20 passed into the ion generator 12 through the flow 30. Thus, the electrical conductivity 198 at the point 202 reflects any number of constituents that may have an effect on electrical conductivity thereof. Thus, the rise in electrical conductivity 198 between the points 202 and 204 represents the increase in electrical conductivity as a result of adding ions 65 from the sacrificial anode 92. Thus, the linearity of the curve 203 is following the current limit curve 156 of FIG. 5. A correspondence exists.

Nevertheless, as illustrated in FIG. 5, the curve 160 departs from the current limit 156. Thus, the curve 203 may depart somewhat from an exact linearity, or from a slope exactly consistent with the current limit 156.

Nevertheless, the increase in electrical conductivity 198 between the points 202 and 204 is a direct function or has a direct variation with flow rate, current, and the length of the anode. Each of these directly affects, and thus is directly proportional to, the increase in electrical conductivity 198 in traversing a curve 203 to the point 204.

The decay curves 205a, 205b, 205c are simply instances of a generalized decay curve 205. Thus, herein it is proper to speak of all the curves 205, or any numbered item according to that reference numeral. Meanwhile, a trailing letter simply means a specific instance of the item corresponding to the reference numeral. Thus, it is proper to illustrate, refer to, or designate using a trailing reference letter or to refer only to the generalized reference numeral.

The decay curves 205a, 205b, 205c refer to different conditions that depend on the incoming water 20 to be treated. For example, the curve 205a represents clean water absent brine, such as sodium chloride, and without heavy metals. Accordingly, the rise in electrical conductivity 198 to the point 204 is entirely due to the addition of the sacrificial anode ions 65. Meanwhile, the drop in electrical conductivity indicates that the heavy metal content has been eliminated by the ion generator 12 and precipitation reactor 14. Thus, the value of the electrical conductivity drops to the lowest value, reflected by the point 206a.

Similarly, the curve 205b represents brine containing heavy metals. Accordingly, upon increase of the electrical conductivity 198 to the value at the point 204, the decay curve 205b decreases the electrical conductivity 198 according to the removed heavy metals, and the removed sacrificial ions 65. This results in the electrical conductivity 198 dropping to the point 206b. Note that the point 206b is still above the axis 196, indicating that residual electrical conductivity 198 is resulting from the brine, which has not been removed by the system 10.

The decay curve 205c results in termination at a point 206c, because the water 20 being treated is water having brine and no heavy metals. Accordingly, the rise in electrical conductivity from the point 202 to the point 204 is entirely due to the donated metal ions 64 from the anode 92. Once those metal ions are removed, the decay curve 205c settles back to the original value at the point 206c, which reflects the presence of brine, and no heavy metals.

In general, the region between the curves 205a and 205c is the operating envelope of the system 10. Thus, whether the water is completely clean of heavy metals, or laden with heavy metals, these extrema are indicated by the graph 194.

It will be appreciated that conductivity (G) is but one of conductivity, acidify (pH), and temperature (T) that can be ascertained at points 202, 204, 206 such that an apparatus and method in accordance with the invention may be similarly optimized and controlled.

Figure 8:
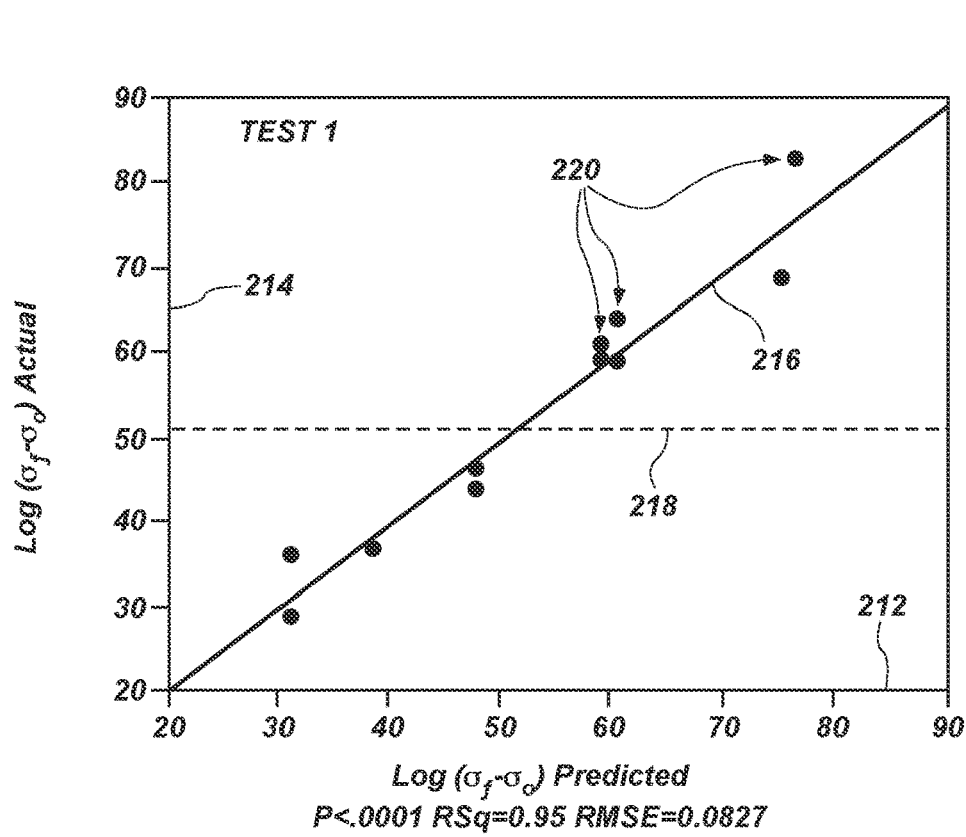
FIG. 8 is a chart showing a least squares fit of data in a log-log format showing the correlation of actual experimental data to the calculated predictions of a system in accordance with the invention.
Figure 9:
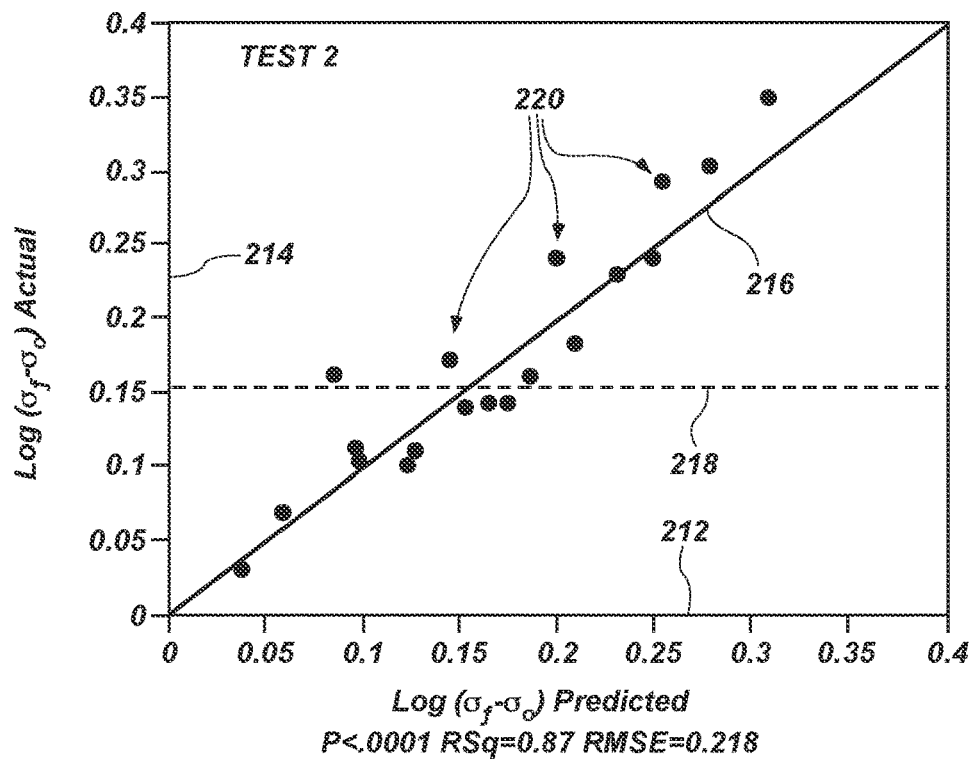
FIG. 9 is a chart showing a least squares fit of data in a log-log format showing the correlation of actual experimental data to the calculated predictions of a system in accordance with the invention, according to another series of tests.

Referring to FIGS. 8 and 9, the experimental work giving rise to the graphs 150, 194 was validated by comparing predicted to actual experimental performance of a system 10 in accordance with the invention. For example, each of the charts 210 includes an x axis 212 or horizontal axis 212 representing a change in electrical conductivity as predicted. That change in electrical conductivity is the value of electrical conductivity at a point 206 compared to electrical conductivity at a point 202.

Each of the values is represented as a logarithm of the actual measured value. Thus, each of the charts 210 represents a log-log comparison. Thus, the y axis 214 or vertical axis 214 represents the change in electrical conductivity actually measured in the experimental system 10.

The curves 216 represents a leased squares fit of the data. The median 218 is illustrated by a dashed line. The individual data points 220 of individual experiments are distributed in the graphs 210. The correlation quality is evident from the "Pvalue" indicated by the letter p in each case, that ratio is less than four significant figures behind the decimal point. Thus, the "Pvalue" is less than one ten thousandth. This represents a high degree of statistical significance to the correlation.

The r squared value indicating the degree of correlation is indicated by the expression RSq and has a value of 0.95 in the first series of tests, and a value of 1.87 in the second series of tests. Similarly, the root mean square of the error represented by the moniker RMSE is also illustrated.

Thus the charts 210 of FIGS. 8 and 9 evidence that the physical system 10 illustrated in FIGS. 1 through 4 indeed operates according to the qualitative representations of FIGS. 5 and 7. Nevertheless, the specific values of any particular curve 160, 200 will depend upon the specific constitution of the incoming water 20, the value of current 50, the material properties of the fluids, the flow rate, and so forth as described hereinabove.

Figure 10:
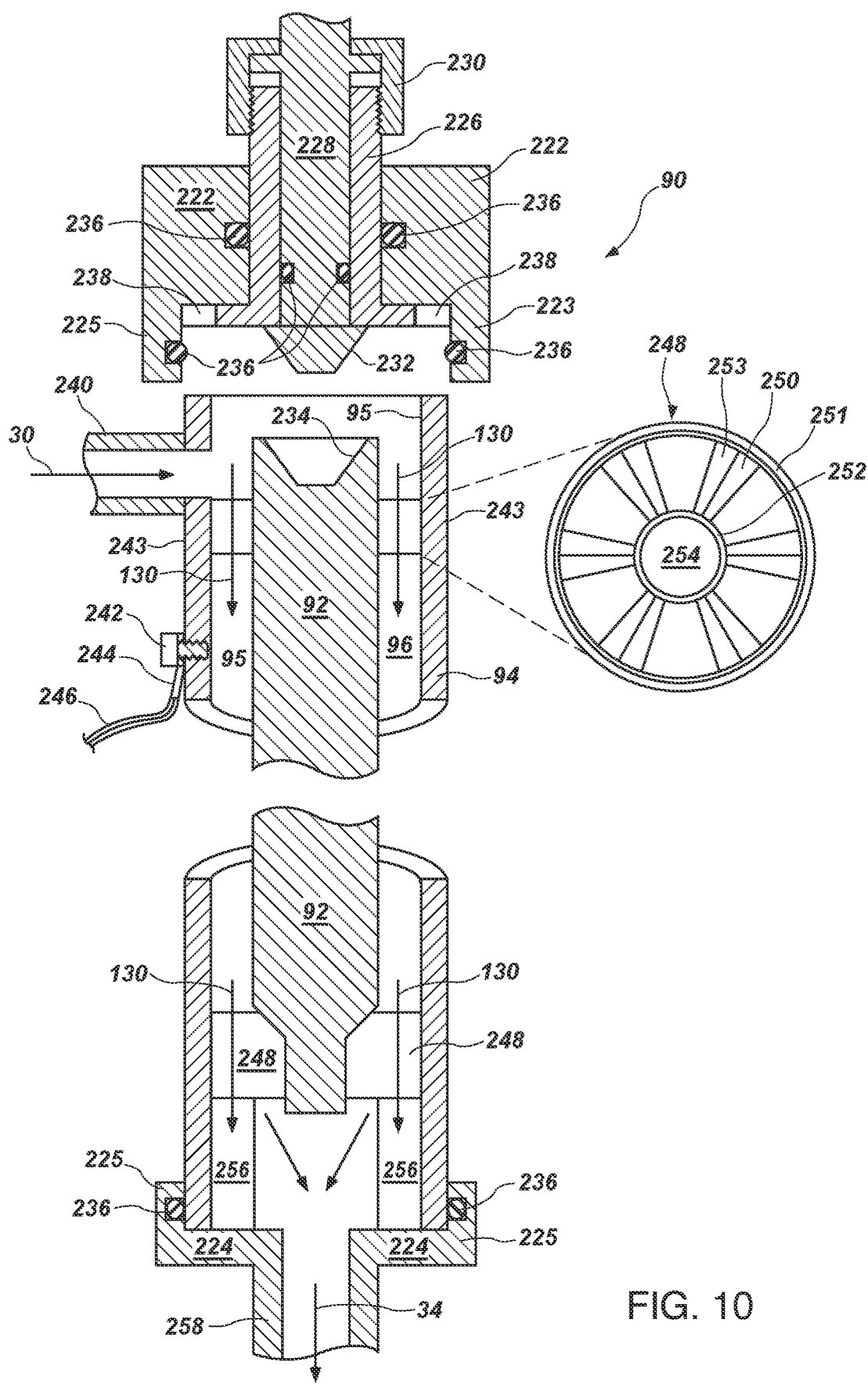
FIG. 10 is a partial, side-elevation, cross-sectional view of one embodiment of a quick-change-out cell system for the ion generator in accordance with the invention, including its sacrificial anode, which must be replaced periodically.

Referring to FIG. 10, while continuing to refer generally to FIGS. 1 through 10, in one embodiment of a cell 90 in accordance with the invention, a specific embodiment of a sacrificial anode 92 may be encased within a tube 94 representing a cathode 94. In the illustrated embodiment, a cap 222 may be formed to include a sleeve 223. The sleeve 223 will engage with a seal 236 and otherwise secure mechanically to the tube 94. Any suitable mechanism will operate.

Various seals 236, such as 'O' rings 236 or the like may be used to seal individual surfaces from passing any fluids, such as vapors, liquids, or the like therethrough. In certain embodiments, a washer 238 may act as a compression fitting 238 activated or distorted by the tube 94 as it fits within the sleeve 225 of the cap 222. In this embodiment, an axial load along the axial direction of the anode 92 may be enforced between the wall of the tube 94, and the washer 238. Thus, the washer will distort in an axial direction, shrinking in that direction in response to force or stress. Meanwhile, the washer 238 will expand in a radial direction in direct consequence thereof according to the Poisson effect, which represents a conservation of mass in solidous materials.

A feed pipe 240 may be secured, such as by welding to feed the flow 30 into the annulus 96 within the tube 94. An anchor 242 may be secured against a surface 243 such as by threading. In one embodiment, a lug 244 held by the anchor 242 against the surface 243 of the tube 94 will feed power from a power line 246 or power cable 246 connected to the current source 50. Various switching and control mechanisms may intervene in order to control application of current, control flow direction into the feed pipe or port 240 and so forth.

The anode 92 may be positioned by guides 248. In the illustrated example, guides 248 are positioned near the top end of the anode 92, and near the bottom end thereof. Typically, the guides 248 may be spoked or includes spokes 250 that represent radial supports 250 positioning the anode 92. The guide 248 may include an outer rim 251 and inner rim 252.

Each of the spokes 250 may extend along a length or axial direction and present a vane 253 that tends to rotate or spin the flow within the annulus 96. In this way, additional turbulence may be initiated in the lumen 96 or annulus 96. The lower guide 248 may be similarly situated, but may also be adapted to act as a seat 248 for the lower end of the anode 92.

For example, in the illustrated embodiment, the anode 92 may be tapered to a reduced diameter and fitted into a seat 248 in order to be self-piloting. The spokes 250 and their vanes 253 may simply be integrated. For example, a face 253 of a spoke 250 may extend radially, axially, and twist circumferentially in order to induce spinning in the flow. It may assure that the flow 130 passes through or between the spokes 250, and has sufficient cross-sectional area and hydraulic diameter to maintain the flow velocity, volumetric flow rate, and so forth. Reductions of area that may be occasioned by the interference by spokes 250 will simply increase velocity, and turbulence.

In the illustrated embodiment, a load block 256 may be a right circular cylinder, which may or may not include spokes 250 and intervening spaces to promote flow therethrough. In the illustrated embodiment, the flow 130 passes through the blocks 256, which support the lower guide 248 axially. Ultimately, the flow 130 will pass through the guide 248 and the load block 256 that stands the guide 248 off away from the outlet port 258 or outlet line 258. It provides sufficient cross-sectional area and hydraulic diameter. Hydraulic diameters is a term of art defined mathematically in engineering science as four times the cross-sectional area divided by the wetted perimeter of a conduit of any shape or passage of any shape.

In accordance with the operational approach for the cells 90, additional variations in diameter, effective roughness, trip lines, or the like may be added to the interior of the tube 94, such as along the surface 95. In order to assure turbulent flow immediately. Typically, flows develop over a distance. Accordingly, boundary layer theory predicts the establishment of flows. In order to maximize turbulence, roughness, features that may trip, such as projections, ridges, and the like, as well as the spokes 250, the vanes 253, integral thereto, or the like may be added to the surface 95, in order to quickly develop turbulence and a bulk plug flow 130 within the annulus 96.

Referring to FIGS. 11-23, various embodiments are illustrated for masking an electrode (anode or cathode) in a system 10 in accordance with the invention. In particular, an ion generator 12 having a centrally located anode 92 spaced from a cathode 94 a distance selected to provide an annulus 96 carrying a flow 130 of liquid to be remediated may have too high a solids content (totally dissolved solids or TDS). The consequence of too high solids, typically comes with an ionic solution of sodium chloride and possibly other salts. Thus, not only the contribution of the TDS, but also the salts result in a very high electrical conductivity through the flow 130, corresponding to a very low electrical resistivity. Accordingly, the net electrical resistance between the anode 92 and cathode 94 may not support the voltage necessary to free ions (e.g., $Al^{3+}$) from the anode 92.

It has been found that various mechanisms may result in an increase in the overall electrical resistance through the flow 130. One mechanism is to limit the area of the surface 93 of the anode 92. The effect of reducing the available surface 93 of the anode 92 is to create a limitation on how many ions may gain access to the flow 130 in order to migrate away from the anode 92. This "traffic congestion" is simply a result of limiting a surface area available in a transport process to participate in the ionization at that surface. Aluminum picks up two electrons to become an aluminum ion ($Al^{3+}$).

By the same token, the surface 93 of the cathode 94 available to contribute electrons into the flow 130 in order to match the charge of the flow of ions may also be limited by masking to limit the portion of the surface 95 available to participate or contact the flow 130. The cathode 94 sponsors a half reaction constituted by a splitting of water molecules. A hydrogen splits off and joins another hydrogen atom to produce hydrogen gas ($H_2$). Meanwhile, hydroxide ions ($OH^-$) having picked up an electron each are left behind in the flow 130. These are available for later construction of the dipoles necessary for creation of pin flock and agglomeration by flocculation. Thus, the surface area 95 available controls the transport process of water molecules accessing the cathode, picking up an electron, and moving back into the flow 130.

Figure 11:
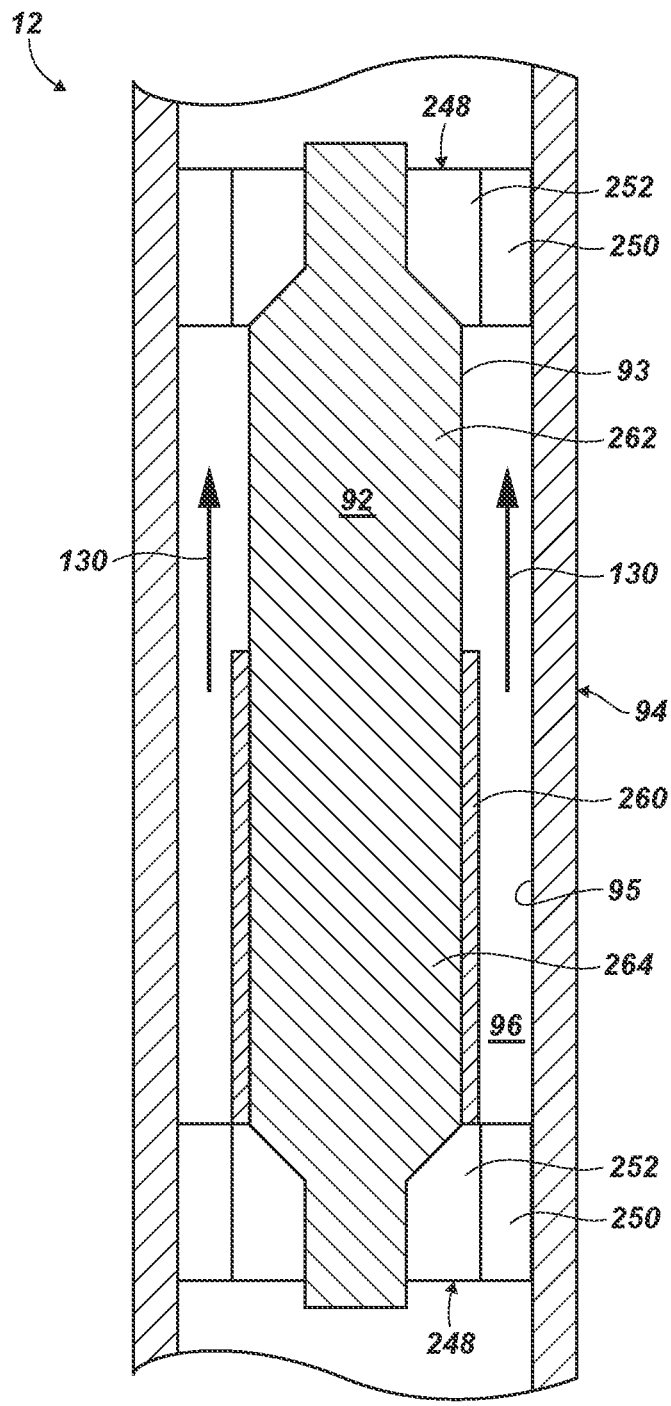
FIG. 11 is a partially cut away, side-elevation, cross-sectional view of one embodiment of ion generator having a portion of the anode masked by a dielectric layer.
Figure 12:
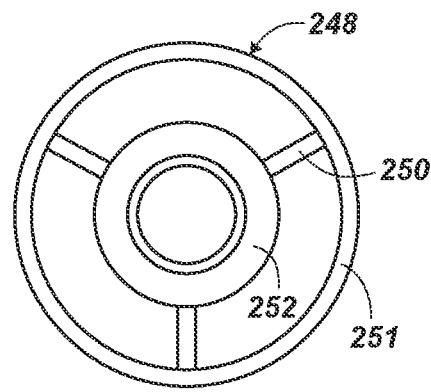
FIG. 12 is a top plan view of one embodiment of a support for the anode.

Referring to FIGS. 11-12, a general concept of a mask 260 illustrates the anode 92 with an exposed portion 262 accessible to the flow 130 in the annulus 96. That exposed area 262 is free to participate fully, within the limitations of boundary layer dynamics as discussed in detail hereinabove.

A mask 260 results in a covered portion 264 not exposed to the flow 130, and therefore unavailable to donate ions into that flow 130. The mask 260 may be formed of any suitable material. Typically, a good mask 260 or effective mask 260, should be impervious to the flow 130, although the mask 260 need not be "air-tight" nor "liquid-tight" with respect to the surface 93 of the anode 92. The distance across the annulus 96 is selected to maintain the appropriate voltage, typically about two volts or more across a one-inch annular gap, required to free ions from the anode 92. In the illustrated embodiment, any portion of the anode 92 in the covered portion 264 will necessarily have little or no access to the flow 130.

As a practical matter, electrical access to any portion of the flow 130 that may seep between the mask 260 and the anode 92 will be limited by both the cross-sectional area of such a gap between the electrode 92, 94 and the mask 260, as well as the distance of any point along the anode 92 in the covered portion 264, from the edge of the mask 260. In other words, the voltage or potential for ionization will be satisfied along the exposed portion 262, to the exclusion of any part of the covered portion 264, which will be separated by a greater resistance.

Figure 13:
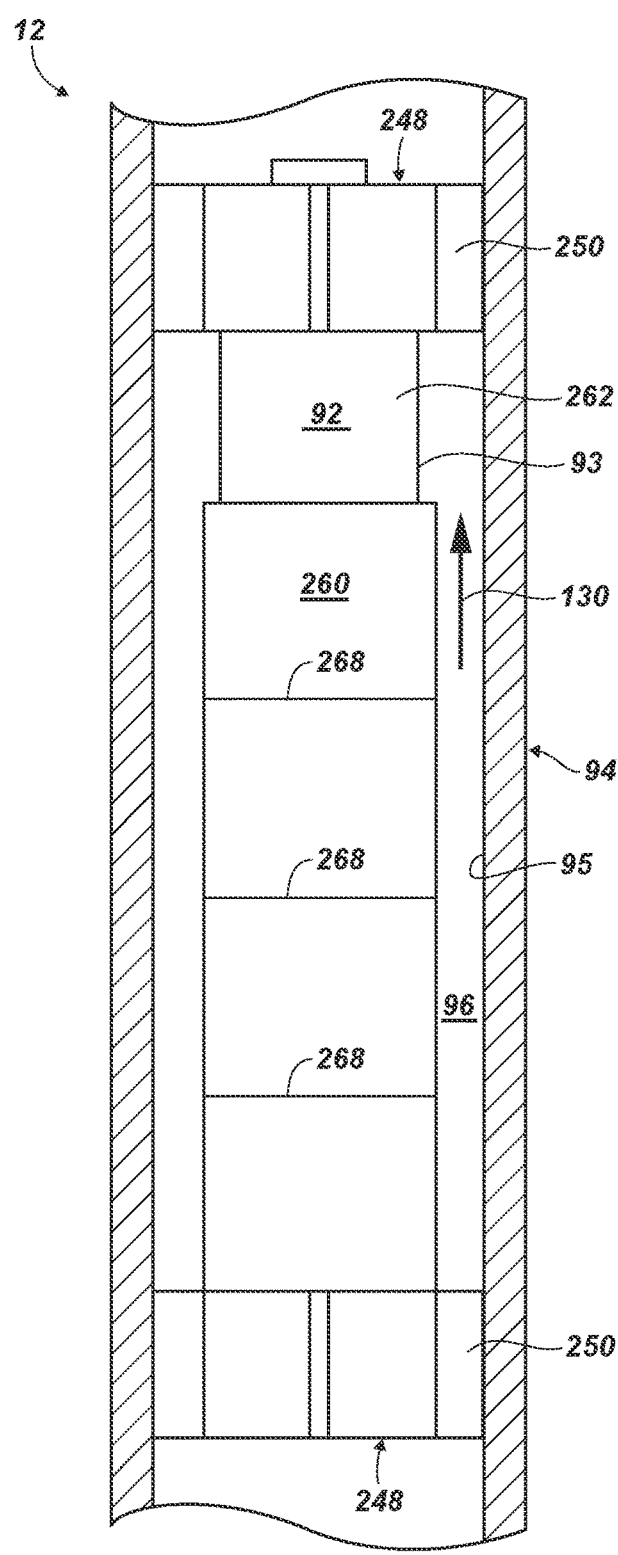
FIG. 13 is a side-elevation view of an alternative embodiment of a dielectric layer having score marks at which to tear off portions of the height of the dielectric mask as necessary in order to expose additional area of the anode.

Referring to FIG. 13, a technician may periodically service an individual cell (combination of an anode 92 and corresponding cathode 94). In the embodiment of FIG. 13, a mask 260 may be formed as a tubular column fitted closely about the anode 92. The mask 260 may be formed in portions 260a, 260b, 260c, and so forth separated by score lines 268 or tear lines 268 having considerably smaller thickness. Thus, a technician may cut or tear at a section 260a, separating it from the segment 260b along the intervening tear line 268. In this way, additional area of anode 92 may be exposed at different times, when the distance has increased between the exposed portion 262 and the corresponding cathode 94.

Figure 15:
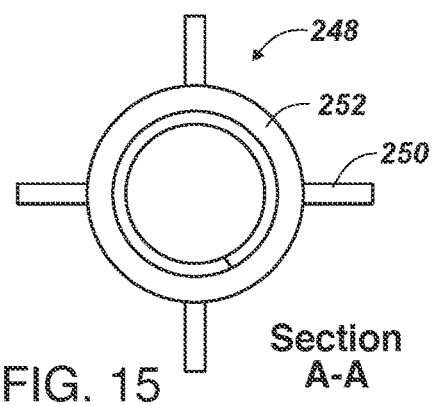
FIG. 15 is a top plan view of an alternative embodiment of a support for the anode.
Figure 14:
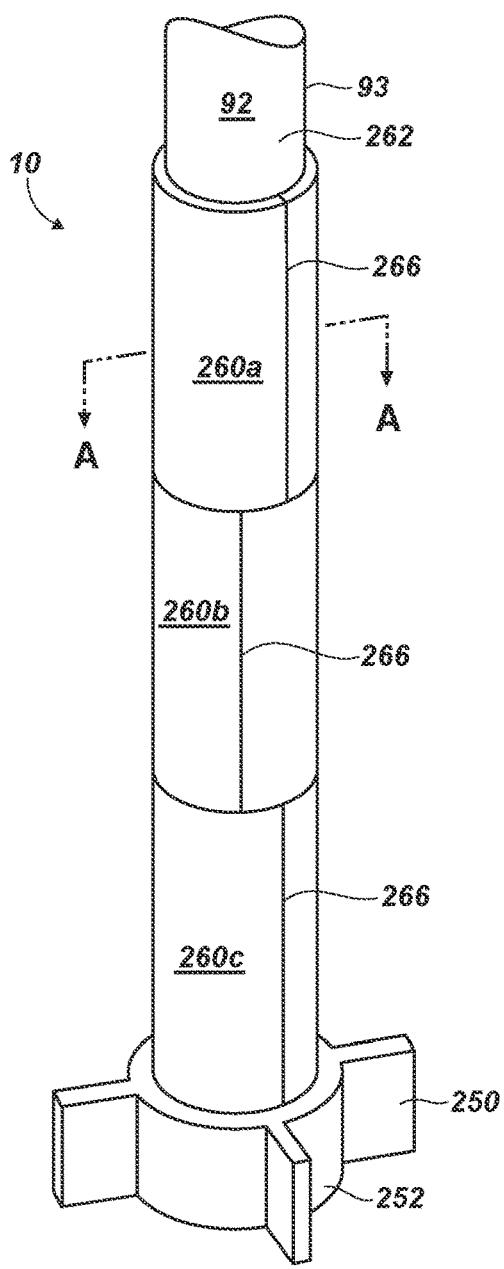
FIG. 14 is a side-elevation view of an alternative embodiment of a mask involving segments or tubular plastic collars having a slit or gap that may be opened in order to snap each length of tubing around the anode, leaving exposed only a portion thereof, which portion may be increased by selective removal of the collars over time.

Referring to FIGS. 14-15, a comparatively thinner dielectric, from a finger print thickness of microns or under a mil, is completely suitable for forming a mask 260. Nevertheless, in this embodiment, a comparatively thicker (greater than one sixteenth inch or two millimeters) segment of tube is formed as mask segments 260a, 260b, 260c. Here, the material and thickness of each of the masks 260a, 260b, 260c is selected to maintain a grip about the anode 92. The individual masks 260a, 260b, 260c may be stacked to form an overall mask 260. By opening a split 266 in each mask 260a, 260b, 260c each may clamp over the anode 92 with the overall stack 260 that constitutes the mask 260. Accordingly, each mask 260a, 260b, 260c may be removed by simply drawing it away from the anode 92, thereby opening the split 260 or brake 266. That split may be in any shape, from the line illustrated to a serpentine shape, a saw tooth shape, or the like.

As a practical matter, each of the masks 260 in FIGS. 11-15 may suitably be applied to an anode 94 rather than a cathode 92. This results in a somewhat different process for manufacture and installation, as well as a somewhat different operational principle.

For example, the anode 92 contributes sacrificial metal ions that will be used as described hereinabove with respect to FIG. 2. Masking the cathode 94 results in limiting the surface area available to participate electrically. Thus, the electrical resistance may be raised by artificially limiting the area and distance, when the resistivity of the specific flow 130 is entirely too low. Thus, if the electrical conductivity of the flow 130 is too high to maintain the necessary voltage needed between the anode 92 and cathode 94 to free ions from the anode 92, area and effective distance may be modified.

Figure 16:
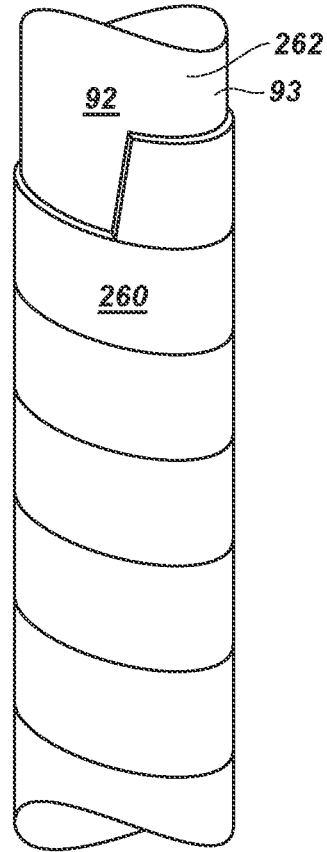
FIG. 16 is a side-elevation view of an alternative embodiment of a dielectric mask involving a tape-like wrapping around the anode, which wrapping may be selectively removed over time in order to expose additional area of the anode.

Referring to FIG. 16, a mask 260 may be wrapped on as a tape 260, a portion thereof being removed by a technician periodically to uncover additional exposed portions 262 of the anode 92. In this embodiment, the mask 260 may be wrapped over itself, or the edges thereof may be abutted against one another. Any small gaps between individual turns of a wrap 260 operating as a mask 260 (just as in FIGS. 14-15) may expose a portion of the anode 92, which may therefore sacrifice and diminish. However, transport processes within such potential gaps are typically an order of magnitude too slow, inasmuch as they are below the boundary layer 106 as discussed hereinabove, have limited area, and their depths are restrictive. Thus, such potential gaps represent no significant effect on the useful operation of a mask 260 over the anode 92.

Figure 17:
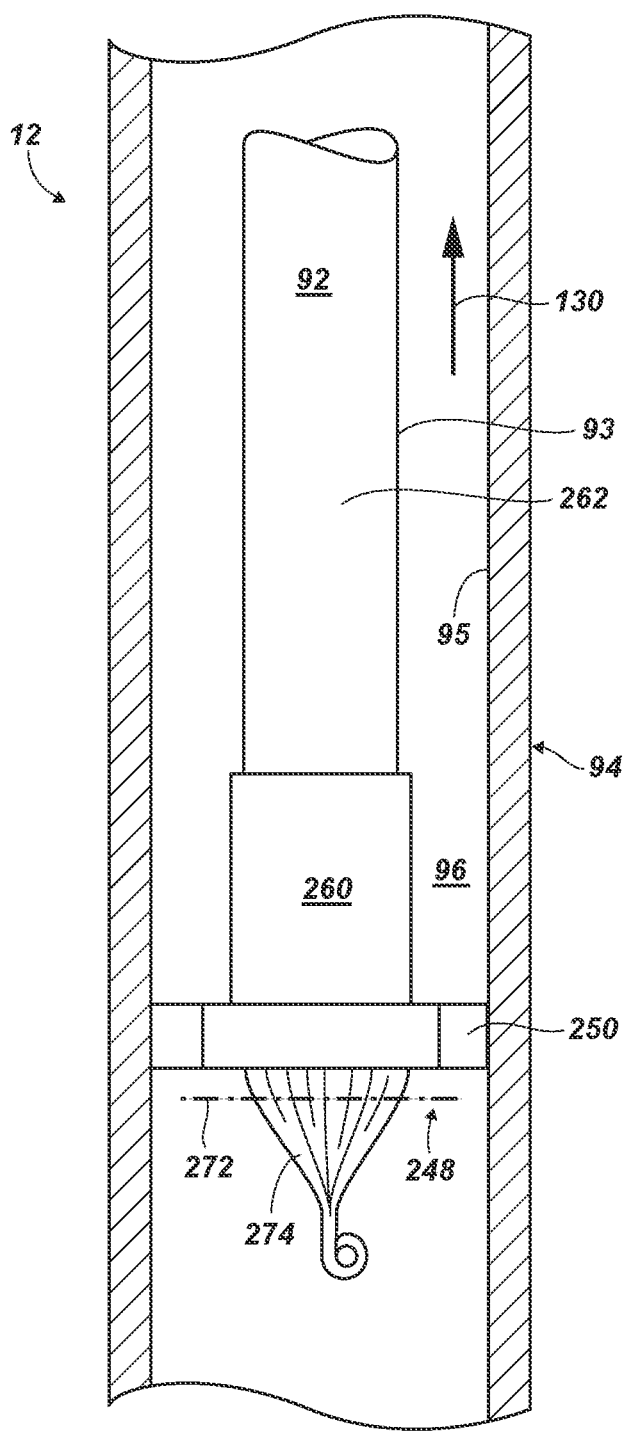
FIG. 17 is a side-elevation view of an alternative embodiment of a tubular dielectric film or layer that may be drawn down to expose additional area of the anode to the flow, with the excess film being collected or cut off.

Referring to FIG. 17, a mask 260 may be configured as a thin sheath over a covered portion 264. The exposed portion 262 may thus be selected to be any amount of the anode 92 desired. In this embodiment, the mask 260 may be configured as a fitted sleeve 260 over the anode 92 to be drawn off and rolled up or discarded. For example, at some cut line 272, a technician may draw down and cut off any excess amount of the mask 260 from the anode 92, in an axial direction with respect thereto.

Figure 18:
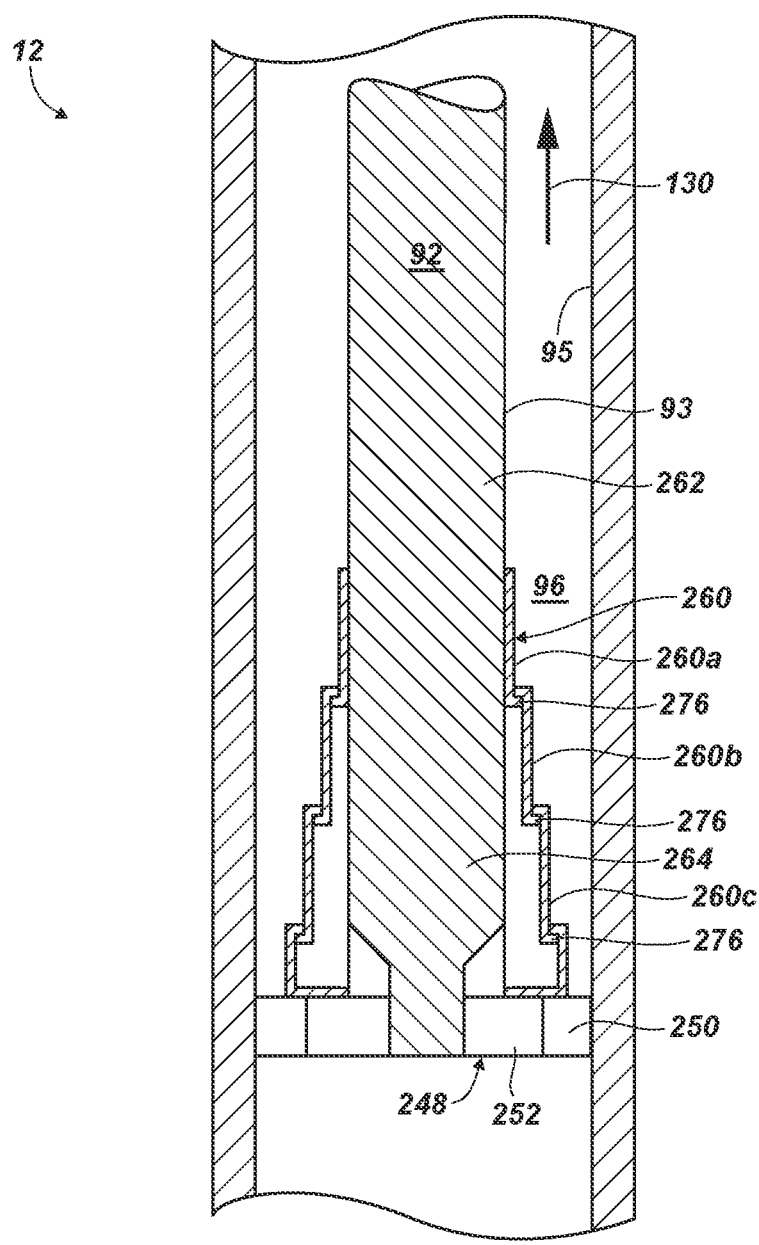
FIG. 18 is a side-elevation, cross-sectional view of an alternative embodiment of a dielectric mask involving telescoping sections of tubing that may be compressed or shortened in order to expose additional surface area of the anode.
Figure 20:
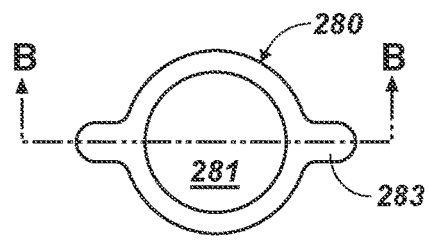
FIG. 20 is a top plan view of the tool of FIG. 19.
Figure 21:
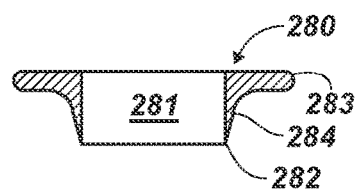
FIG. 21 is a side, elevation, cross-sectional view thereof.
Figure 22:
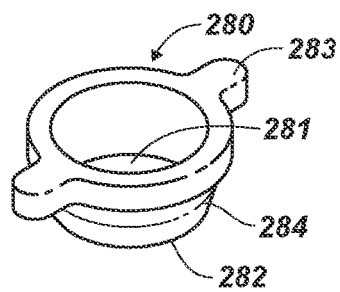
FIG. 22 is an upper perspective view thereof.
Figure 19:
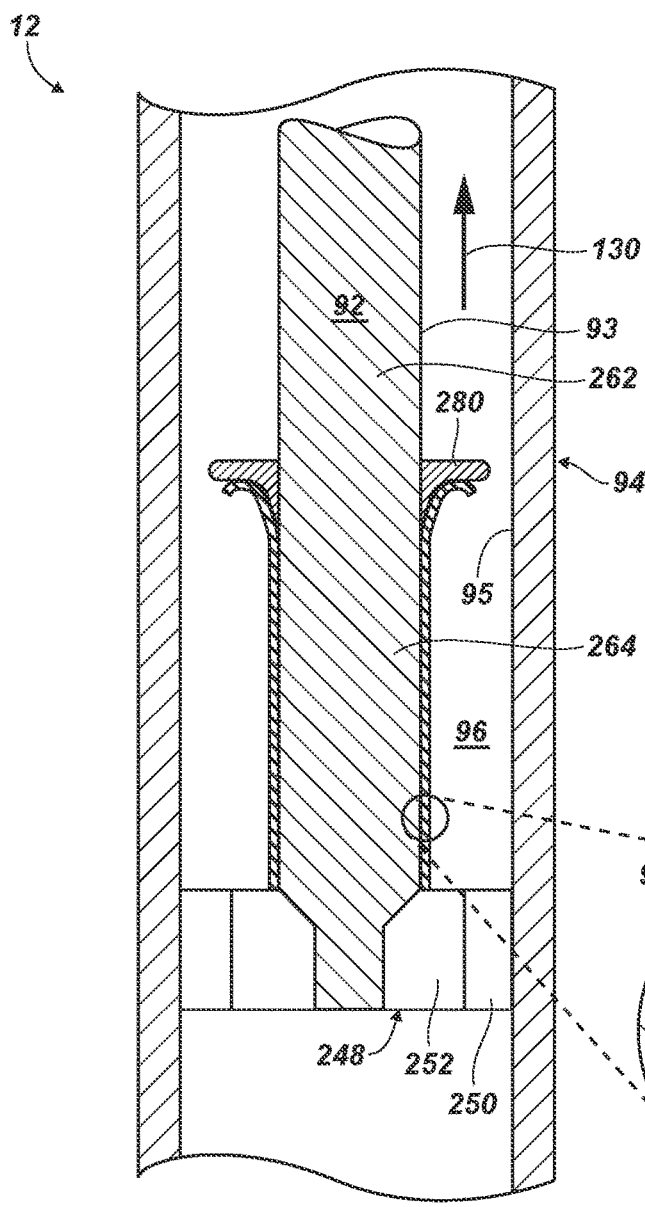
FIG. 19 illustrates an alternative embodiment of a dielectric layer applied, such as by spraying or dipping an anode, later to be removed by a sharp-edged tool scraping the mask away from the anode.
Figure 19:
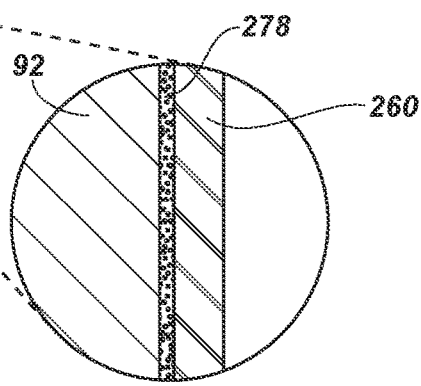

Referring to FIG. 18, an alternative embodiment may simply involve a telescoping mask 260 comprising segments 260a, 260b, 260c that are telescoped together, rather than separated off as in embodiments described immediately hereinabove. The segments 260a, 260b, 260c may be provided with some mechanism 276 as a detent 276. For example, a rim may be provided on one surface and matched by a relief into which that rim can fit. That is, a ring projecting away from the surface, whether inner or outer, may fit into one of several relief regions matched in shape. In other embodiments, mere friction, due to a compression fit or an interference fit may result in stabilizing the mask 260 by stabilizing the segments 260a, 260b, 260c with respect to one another.

Of course, more segments 260a, 260b, 260c may be added. Meanwhile, any type of a detent 276 that will typically cause an interference between a portion of one segment 260a, 260b, 260c, and any other fitted thereto may act to stabilize the telescoping mask 260. In fact, a technician may simply push down on the outermost or highest segment 260a, and allow relative movement between any pair of segments 260a, 260b, 260c that move first. The entire covered portion 264 remains shielded, thereby presenting a higher resistance, and resulting voltage requirement, than does the exposed portion 262.

Referring to FIGS. 19-22, anodes 92 may simply be manufactured with a dipped coating. It may be useful to provide a release 278 such as some type of mold release between the mask 260 and the anode 92. This will assist in separating the mask 260 when a portion thereof needs to be peeled away from the anode 92 in order to uncover additional exposed area 262.

Nevertheless, it has been found that a dielectric coating as thin as an oily fingerprint of a person may be sufficient to coat an anode 92, and render that particular region ineffective to participate reliably in donating ions into the flow 130. Accordingly, the release material 278 would best serve if it is an easily dissolved material. Thus, it could be something as simple as a cornstarch powder, salt powder, or the like that would immediately dissolve in the flow 130 upon exposure thereto.

In this embodiment, a tool 280 may be used to separate or peel the mask 260 from the anode 92. The tool 280 may have an aperture 281 fitted to the full diameter of the anode 92, terminating at the lower edge 282 with a sharp edge 282 that will peel or cut the mask 260 away from the anode 92. A handle 283 may be provided for a user, extending from the principal frame 284 or guide 284 that forms the principal structure 284 of the tool 280.

In other embodiments, a basic industrial knife, such as a box cutter or the like may simply score the mask 260 parallel to the longitudinal direction of the anode 92, and then cut around a circumference of the anode 92. Thus, no tool 280 need be left in the flow 130.

Figure 23:
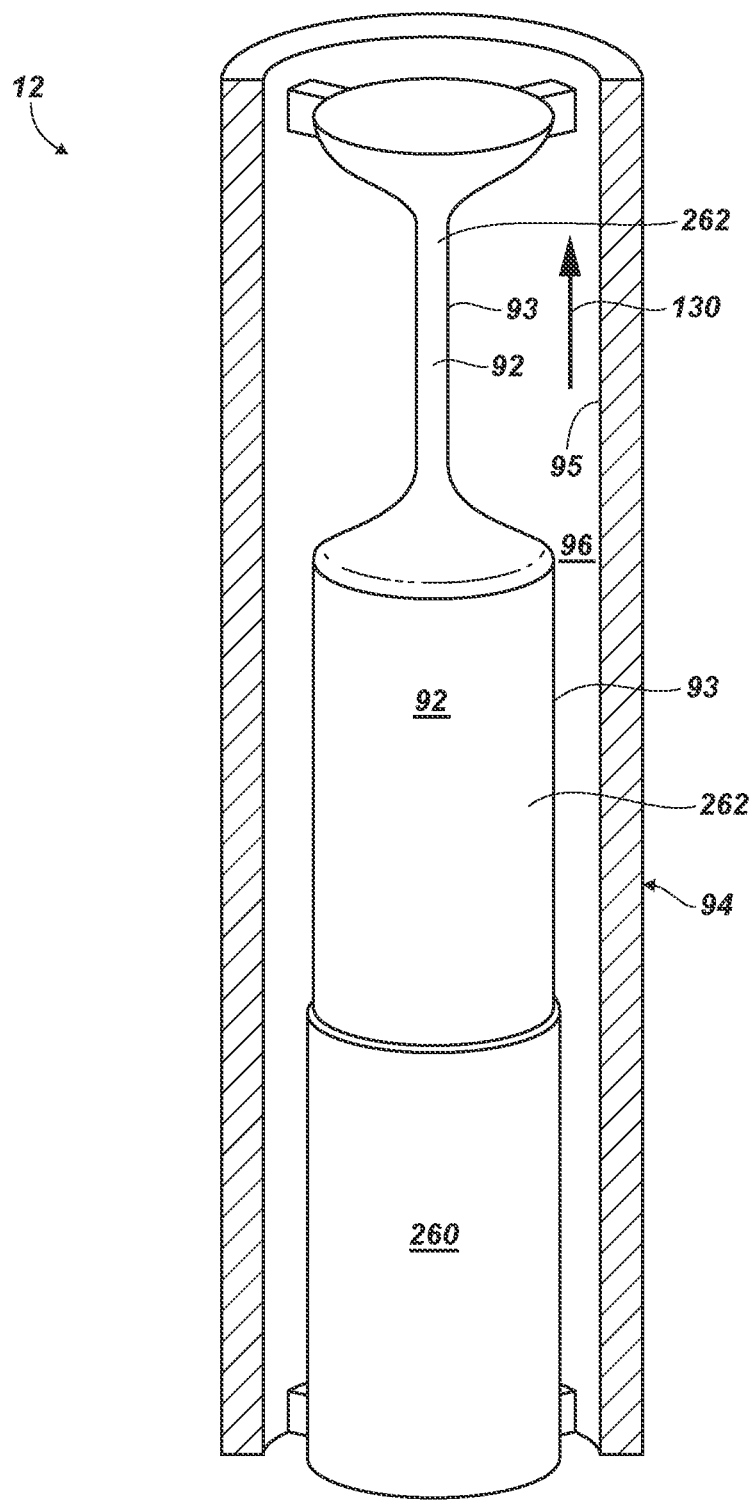
FIG. 23 is a side-elevation view of an anode illustrating an uppermost or first portion that has been exposed for some time to sacrificing ions into a surrounding flow (stream), a second, central portion that has just been exposed by removal of a mask, and a lower portion that remains masked.

Referring to FIG. 23, an anode 92 is illustrated with portions 262a, 262b, 264 in three conditions. The top portion 262a condition is that which exists following considerable loss of ions by the sacrificial anode 92. That is, in experiments, the anode 92 decreases in diameter cleanly and uniformly throughout, as if it were machined very precisely. The resistance, and therefore the voltage requirement will increase between the anode 92 and the cathode 94 as a result of the reduction in diameter of the exposed portion 262a, as a result of the increase in distance therebetween as well as the reduction in surface area.

Meanwhile, the central section 262b illustrates a portion of the anode 92 that has barely been exposed, to become part of the exposed portion 262, as compared with the eroded or sacrificed, exposed region 262a thereabove. Accordingly, the exposed area 262b or exposed region 262b has an additional area, still limited and at a reduced distance, which is still reduced from that of the full anode 92, and therefore effective to elevate resistance and support a voltage required to participate in donating ions into the flow 130.

Finally, the covered portion 264 is surrounded by the remaining mask 260. In due course, the exposed portion 262b will come to look like the exposed portion 262a. Inasmuch as the proximity and surface area on the exposed portion 262b are more favorable, and require less voltage, although sufficient to effect the migration of ions, the exposed portion 262a will not decay in diameter appreciably during the operation of the exposed portion 262b. Of course, ultimately, the entirety of the mask 260 is removed over the covered portion 264, rendering it again another exposed portion 262.

Figure 24:
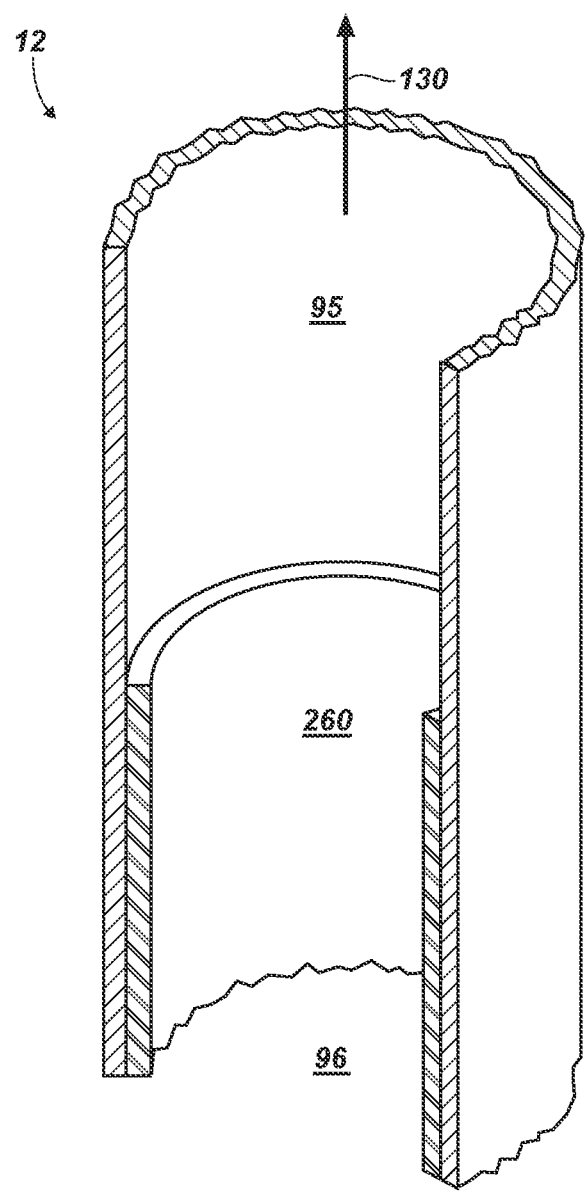
FIG. 24 is a sectioned view of a cathode having a portion of its area masked by a dielectric layer.

Referring to FIG. 24, each of the previously discussed masks 260 may be adapted to use against an inner surface 95 of the cathode 94. As a practical matter, the adaptation of each mask 260 will be somewhat different being on an interior surface 95 of the cathode 94, rather than the outer surface 93 of anode 92.

For example, the thinnest of coatings a few thousandths of an inch (several microns) provides sufficient dielectric interference to mask 260 a covered portion 264 of the anode 92. Meanwhile, mechanically, tensile forces in a shrink-type wrap 260, or simply a fitted wrap 260 may be sufficient to maintain the mask 260 in place over an anode 92. In contrast, the mask 260 over the inside surface 95 of a cathode 94 may need sufficient structural stability and grip against the cathode 94 to maintain its position at the cathode 94 within the flow 130, or rather surrounding the flow 130. Thus, the thickness of the mask 260 may be required to be self-supporting of the mask 260.

Figure 25:
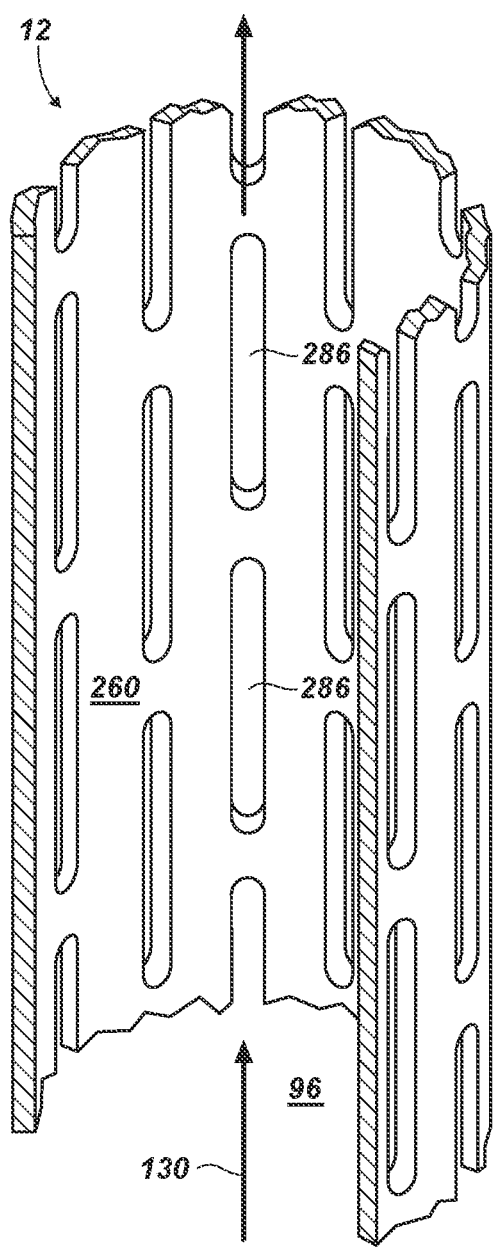
FIG. 25 is a side-elevation, cross-sectional view of a cathode having a perforated mask providing partial masking and partial open gaps, also including optional vanes for engaging the flow, and thereby rotating the mask within the cathode.

Referring to FIG. 25, in certain embodiments, a mask 260 may actually be provided with vents 286 or gaps 286 to expose, or to define the exposure areas of, the cathode 94. Long single slits 286, short elliptical gaps 286, or the like may be provided. Since the anode 92 sacrifice ions, it will decay. In contrast, the cathode 94 contributes only electrons. Thus, it is not degraded or eroded. Thus, there is not the same requirement that the mask 260 continue to expose a different portion of the surface 95 of the cathode 94. Nevertheless, it may be necessary to open up more area on the surface 95, which may then be done by removal of the masking material 260 as done in the anodic masks 260 described hereinabove.

Figure 26:
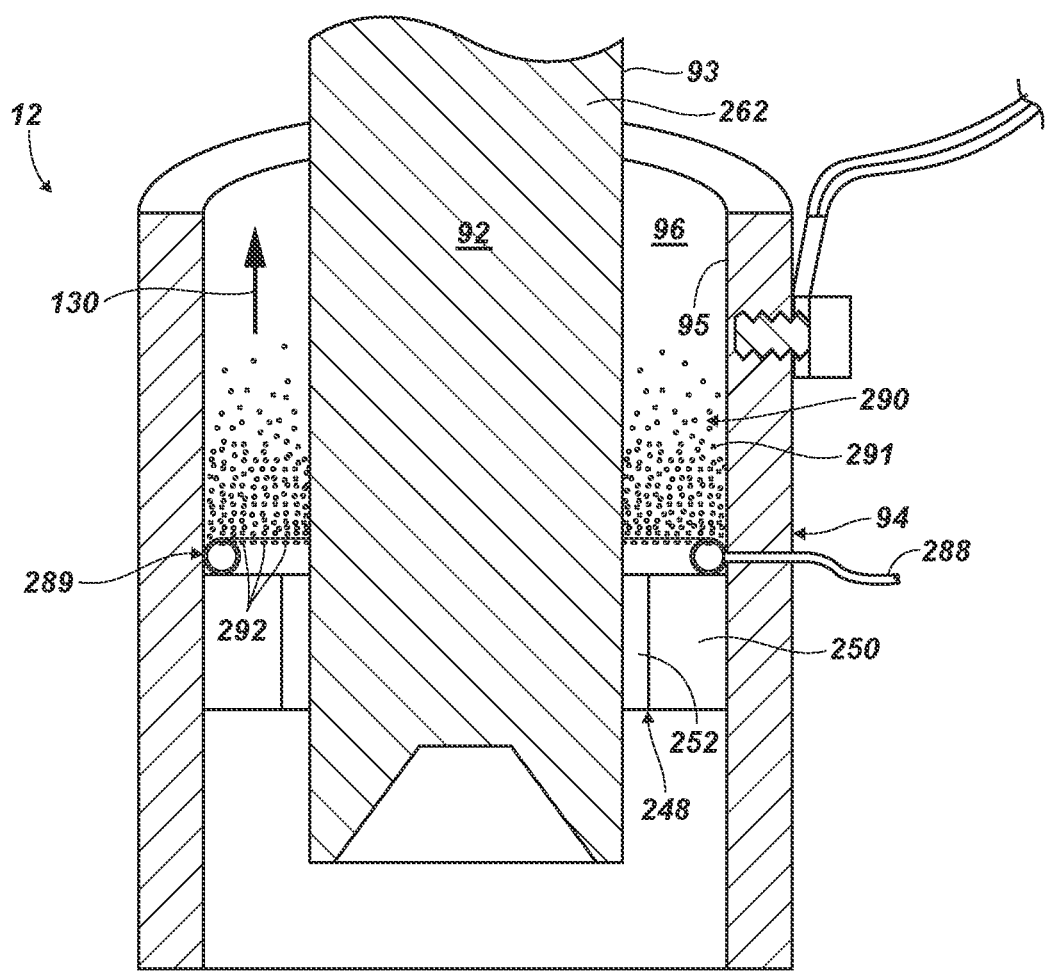
FIG. 26 is a side-elevation, cross-sectional view of an alternative embodiment of ion generator cell relying on injection of gas bubbles, such as air, around a circumference of very small orifices creating a curtain of bubbles in front of an electrode, illustrated as the cathode, but also possible in an anode configuration.

Referring to FIG. 26, in keeping with the vigorous flow 130 maintained in the annulus 96, a significant improvement may be made in the adjustability and effectiveness of masking 260, generally. It has been found and tested that a line 288 may be attached to feed a plenum 289 around the supports 250 or the outer rim 251 of the supports 250 described hereinabove.

As it turns out, a curtain 290 of tiny bubbles 291, which may actually be too small to be seen individually by the naked eye, may be injected through orifices 292. By suitable selection of the flow rate of air or other gas through the line 288, and the sizing of the orifices 292, the bubbles 291 may be maintained effectively within the boundary layer 106 as discussed above with respect to the anode 92, at the inside surface 95 of the cathode 94.

The bubbles 291, as contained gas, represent dielectric gaps in the flow 130. Thus, resistivity, effective (a material property) or effective resistance (net overall effect) between the anode 92 and cathode 94 is increased by an increasing path length for electrons and ions passing around bubbles 291 in the boundary layer 106 of the surrounding flow 130. This increase in distance is effectively increasing the effective width of the annulus 96 (effective electrical path length) between the anode 92 and the cathode 94.

In fact, the need for masking 260, in general, is one of initial voltage management in highly conductive flows 130. For example, above about 100,000 parts per million of total dissolved solids, the combination of solids and typical salts in solution will begin to provide an electrical conductivity so high as to not maintain a required voltage (e.g., voltage is equal to current times resistance) needed to move ions from the anode 92 into the flow 130. As the decay of the diameter of the anode 92 proceeds, that distance becomes larger, as long as the voltage is sufficient.

When the required voltage becomes too high such that the current source fails, it cannot be used. Current and voltage cannot be maintained to supply the flow of electrons and ions. Then, the remaining, thinned anode 92 must be removed and replaced. In certain of the embodiments immediately hereinabove, additional area may then be exposed. However, the basic reason for the management of available electrical area and effective path length is to provide either a constriction or liberation of the flow of electrons and ions as necessary, to match a current source to an electrical conductivity of a flow 130.

Thus, the bubble curtain 290 provides a path length, providing a virtual lengthening of the path across the annulus 96. The bubble curtain does provide masking 260 to some extent, but is effectively doing so by providing dielectric bubbles 290, close to an electrode 92, 94 in order to increase resistivity or effective electrical resistance across the annulus 96 to support a voltage requirement.

Analytical experiments (computer modeling of components and configurations to calculate certain dependent variables based on other independent variables) have been executed to determine the effect of masking. The "electrical path" between anode 92 and cathode 94 is necessarily complex when both are not identical in length and registration (no offset vertically/axially from one another). The liquid in such cases presents a virtually infinite number of parallel paths for electrons and ions to traverse the annulus 96. It has been shown that such a masking of a portion of either the anode 92 or cathode 94 results in an increase in voltage therebetween for a given TDS or its consequently increased electrical conductivity (decreased resistivity).

The practical effect is that high values of TDS, such as 150,000 ppm, 200,000 ppm, and even 250,000 ppm do not fail the system 10. Saturation occurs at about 280,000 ppm TDS. Nevertheless, the 1.69 volts required to free ions from the anode 92 can still be imposed across the annulus 96 by masking a sufficient area of the anode 92 to increase the overall resistance across the annulus. Controls simply need to provide an electrical current at a desired value (current in Amperes translates directly to Coulombs of charge in the ionic reactions) for the number of ions to be introduced into the flow 30.

If voltage is determined to be too low (below 1.69 volts), by analytical or empirical methods, due to too short a distance or too high a conductivity, masking off a portion of the area of the anode 92 or cathode 94 may be implemented. Meanwhile it has been found that the power supply 50 or current source 50 most typically available at an installation produces about 10 KVA of energy. Meanwhile, voltage across a 1-inch (2.54 cm) annulus needs to be at least 1.69 volts, but will often increase to about 24 volts when anode erosion approaches another inch of gap (with associated loss of surface area). Thus, to maintain operational currents on the order of 100 to 400 Amperes or more to match ion production needs, the systems 10 need to operate within these limiting parameters.

An empirical model of the bubble curtain was created with square flat plates, about a foot square (30 cm×30 cm) and an inch apart. Between the plates, acting as anode 92 and cathode 94, water containing dissolved salts increased electrical conductivity. Maintaining suitable voltages and currents was done for various levels of salinity up to an equivalent resistivity/conductivity corresponding to 250,000 ppm TDS. The pressure-controlled introduction of an air bubble curtain 290, successfully increased the effective electrical resistivity between the plates sufficiently to support the 1.69 volts needed to release anodic ions, even at this upper extreme of actual conductivity. Voltage may then be increased and the curtain 290 removed as the anode recedes due to sacrificing ions.

One may wonder why a feedback control could not be implemented based on incoming conductivity and outgoing conductivity. Conductivity results from dissolved solids and other ions, particularly salt. Although salt is useful to establish electrical conductivity in experiments to show voltage control by use of masks 50 and bubble curtains 290, it is actually a background material. Its presence raises conductivity, but often relegates TDS to a small portion of the overall contribution to electrical conductivity. Thus, a system 10 in accordance with the invention cannot rely on the accuracy of measurements of conductivity incoming and outgoing, as the TDS contribution thereto is a small difference in two numbers orders of magnitude (often 3 or more) larger than their difference.

Thus, the system 10 reduces boundary layer thickness with "plug flow" or "hyper-turbulent flow," and current is set to match the ions needed to match the mass flow rate and TDS. Normally, it is best to maintain a constant current and adjust voltage to the minimum required, which minimum increases as distance across the annulus (anode to cathode) increases and as available area exposed (at anode 92 or cathode 94) decreases (typically at the anode 92 as it sacrifices ions). Thus current controls the ion flow, and voltage is adjusted to maintain the current flow. Voltage may require an increase as distance increases or area decreases.

The present invention may be embodied in other specific forms without departing from its purposes, functions, structures, or operational characteristics. The described embodiments are to be considered in all respects only as illustrative, and not restrictive. The scope of the invention is, therefore, indicated by the appended claims, rather than by the foregoing description. All changes which come within the meaning and range of equivalency of the claims are to be embraced within their scope.

What is claimed and desired to be secured by United States Letters Patent is:

1. A method for removing metals from a flow of liquid:
   providing a flow of a liquid containing target ions of a target metal;
   providing a cathode, as a conduit, and an anode, formed of a sacrificial metal passing axially through the conduit, leaving an annulus therebetween, the anode being capable of providing sacrificial ions of the sacrificial metal;
   limiting a surface area of the anode exposed to the flow by masking a portion of the anode;
   directing the flow through the conduit;
   generating the sacrificial ions at the anode and releasing them into the flow by applying an electrical potential between the anode and cathode; and
   resisting reaction between the target ions and the sacrificial ions within the annulus by maintaining a boundary layer therebetween resulting from hyper-turbulence in the annulus.

2. The method of claim 1, comprising overcoming weak forces between products of reaction in the annulus by the hyper-turbulence.

3. The method of claim 2, comprising limiting flocculation, in the annulus, of precipitants comprising the sacrificial ions and the target ions by maintaining the hyper-turbulence in the flow in the annulus.

4. The method of claim 1, comprising resisting precipitation of reactants composed of the sacrificial ions and target ions by mechanically isolating the target ions from the anode by the maintaining of the boundary layer.

5. The method of claim 1, comprising resisting flocculation of reactants by a combination of the resisting reaction of the target ions and sacrificial ions and by overcoming weak forces of aggregation of reaction products by the maintaining of the hyper-turbulent condition in the annulus and the boundary layer corresponding to the hyper-turbulence proximate the anode.

6. The method of claim 1, further comprising controlling quantity of sacrificial ions exposed to the flow by controlling the area of the exposed surface of the anode.

7. The method of claim 1, comprising maintaining a migration of the sacrificial ions into the flow by increasing the electrical potential between the anode and cathode in response to receding by the anode away from the cathode.

8. The method of claim 1, further comprising removing a portion the masking from the anode in response to at least one of a reduction of the surface area of the anode due to migration of sacrificial ions, a rise in the electrical potential required to maintain a current flow between the anode and cathode at a pre-determined value, and a reduction in electrical conductivity through the flow.

9. The method of claim 1, further comprising providing a volumetric flow rate of the flow in a plug flow hydrodynamic regime.

10. A method of removing contaminants by flocculation based on target metal ions in a flow, the method comprising:
    providing a cathode, as a conduit capable of conducting a flow comprising water carrying contaminants containing target metal ions;
    providing an anode, formed of a sacrificial metal as a source of sacrificial ions, the anode forming an annulus by passing axially through the conduit;
    limiting a surface area of the anode exposed to the flow by applying a mask onto a portion of the anode;
    directing the flow through the annulus while imposing an electrical potential between the cathode and anode;
    generating the sacrificial ions at the anode and releasing them into the flow in response to the electrical potential;
    controlling a value of the electrical potential in response to an increase in distance between the anode and cathode due to migration of the sacrificial ions into the flow;
    exposing an additional surface area of the anode by removing at least a portion of the mask in response to the increase in the electrical potential required to maintain the migration of the sacrificial ions.

11. The method of claim 10, comprising:
    resisting interaction between the target ions and the sacrificial ions within the annulus by maintaining a boundary layer therebetween resulting from hyper-turbulence in the annulus; and
    overcoming weak forces between products of reaction of the sacrificial ions as sacrificial dipoles and target-ion-bearing contaminants as target contaminants in the annulus by the hyper-turbulence.

12. The method of claim 10, comprising:
    limiting agglomeration into flocculants by the sacrificial dipoles and the target contaminants by a combination of the resisting reaction of the target ions and the water in the flow and the overcoming of the weak forces required for the aggregation.

13. The method of claim 10, comprising:

controlling quantities of sacrificial ions exposed to the flow by controlling the area of the exposed surface of the anode;

maintaining a migration of the sacrificial ions into the flow by increasing the electrical potential between the anode and cathode in response to increased distance developing between the anode and cathode;

removing a portion the masking from the anode in response to at least one of a reduction of the surface area of the anode due to migration of sacrificial ions, a rise in the electrical potential required to maintain a current flow between the anode and cathode at a pre-determined value, and a reduction in electrical conductivity through the flow.

\* \* \* \* \*